(12) United States Patent
Ochiai et al.

(10) Patent No.: US 10,097,720 B2
(45) Date of Patent: Oct. 9, 2018

(54) SOUND ABSORBER, SHEET FEEDER INCORPORATING THE SOUND ABSORBER, IMAGE READING DEVICE INCORPORATING THE SHEET FEEDER, IMAGE FORMING APPARATUS INCORPORATING THE SOUND ABSORBER, AND ELECTRONIC DEVICE INCORPORATING THE SOUND ABSORBER

(71) Applicants: Takaya Ochiai, Kanagawa (JP); Takeshi Akai, Kanagawa (JP); Ikuhisa Okamoto, Kanagawa (JP); Takehisa Shimazu, Kanagawa (JP); Youhei Niitsuma, Kanagawa (JP)

(72) Inventors: Takaya Ochiai, Kanagawa (JP); Takeshi Akai, Kanagawa (JP); Ikuhisa Okamoto, Kanagawa (JP); Takehisa Shimazu, Kanagawa (JP); Youhei Niitsuma, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/384,199

(22) Filed: Dec. 19, 2016

(65) Prior Publication Data
US 2017/0180586 A1 Jun. 22, 2017

(30) Foreign Application Priority Data
Dec. 22, 2015 (JP) .................................. 2015-250006

(51) Int. Cl.
*G03G 15/00* (2006.01)
*H04N 1/00* (2006.01)
*G03G 21/16* (2006.01)
*G10K 11/16* (2006.01)
*G10K 11/172* (2006.01)

(52) U.S. Cl.
CPC ..... *H04N 1/00976* (2013.01); *G03G 21/1619* (2013.01); *G10K 11/16* (2013.01); *G10K 11/172* (2013.01); *H04N 1/0032* (2013.01); *H04N 1/0034* (2013.01); *H04N 1/00058* (2013.01); *H04N 1/00795* (2013.01); *G03G 2215/00637* (2013.01); *H04N 2201/0094* (2013.01)

(58) Field of Classification Search
CPC ........................................ G10K 1/161
USPC ........................................... 399/361
See application file for complete search history.

(56) References Cited

U.S. PATENT DOCUMENTS 3,049,190 A * 8/1962 Coffman .................. E04B 1/994
160/114
3,382,947 A * 5/1968 Biggs ...................... E04B 1/994
181/30

(Continued)

FOREIGN PATENT DOCUMENTS

JP 9-156175 6/1997
JP 2008-049587 3/2008

*Primary Examiner* — Anthony Nguyen
(74) *Attorney, Agent, or Firm* — Duft Bornsen & Fettif LLP

(57) ABSTRACT

A sound absorber, which is included in a sheet feeder included in an image reading device, an image forming apparatus, and an electronic device, includes a cavity, a communication portion through which the cavity communicates with an outside of a sheet feeder, and a communication direction changing device configured to change a communication direction of the communicating portion.

9 Claims, 13 Drawing Sheets

(56) References Cited

U.S. PATENT DOCUMENTS

| | | | | | |
|---|---|---|---|---|---|
| 3,860,085 | A | * | 1/1975 | Gilbert | G10K 11/16 181/205 |
| 4,875,312 | A | * | 10/1989 | Schwartz | E04B 1/994 181/287 |
| 4,976,391 | A | * | 12/1990 | Jessen | B41J 29/10 242/615.3 |
| 5,121,811 | A | * | 6/1992 | Shima | B41J 29/10 181/201 |
| 5,893,011 | A | * | 4/1999 | Yoshida | G03G 15/60 399/203 |
| 8,573,356 | B1 | * | 11/2013 | Perdue | E04B 1/994 181/284 |
| 2011/0221118 | A1 | * | 9/2011 | Kamichika | B41J 11/0045 271/4.12 |
| 2016/0170355 | A1 | | 6/2016 | Heishi et al. | |

* cited by examiner

SOUND ABSORBER, SHEET FEEDER INCORPORATING THE SOUND ABSORBER, IMAGE READING DEVICE INCORPORATING THE SHEET FEEDER, IMAGE FORMING APPARATUS INCORPORATING THE SOUND ABSORBER, AND ELECTRONIC DEVICE INCORPORATING THE SOUND ABSORBER

CROSS-REFERENCE TO RELATED APPLICATION

This patent application is based on and claims priority pursuant to 35 U.S.C. § 119(a) to Japanese Patent Application No. 2015-250006, filed on Dec. 22, 2015, in the Japan Patent Office, the entire disclosure of which is hereby incorporated by reference herein.

BACKGROUND

Technical Field

This disclosure relates to a sound absorber, a sheet feeder incorporating the sound absorber, an image reading device incorporating the sheet feeder, an image forming apparatus incorporating the sound absorber, and an electronic device incorporating the sound absorber.

Related Art

Electrophotographic image forming apparatuses include a sound absorber that restrains leakage of a drive sound to an outside of the sound absorber.

A known image froming apparatus includes a sound absorber that has a structure of Helmholtz resonator by including a cavity and a communicating portion that allows communication between the cavity and an outside of the sound absorber, so that the sound absorber absorbs a sound generated at the time of image formation by the image forming apparatus.

Such a sound absorber having a configuration of Helmholtz resonator has different sound absorption efficiencies depending on the communication direction from the cavity to the outside of the sound absorber and the position of a sound source with respect to the sound absorber. When the sound absorber is installed in the image forming apparatus, the communication direction of a communication portion is not constantly a direction having a high sound absorption efficiency. Therefore, when the direction has a low sound absorption efficiency, an abnormal sound can occur during image formation and may be transmitted to the outside the image forming apparatus.

SUMMARY

At least one aspect of this disclosure provides a sound absorber including a cavity, a communication portion through which the cavity communicates with an outside of a sheet feeder, and a communication direction changing device to change a communication direction of the communication portion.

Further, at least one aspect of this disclosure provides a sheet feeder including a passage defining device to form a document feeding passage through which a document sheet passes, and the above-described sound absorber to absorb a sound.

Further, at least one aspect of this disclosure provides am image reading device including a document feeder to feed a document sheet having an image on a surface and include the sheet feeder, and a document reading device to read the image on the document sheet conveyed by the document feeder.

Further, at least one aspect of this disclosure provides an image forming apparatus including the above-described sound absorber to absorb a sound at a time of an operation.

Further, at least one aspect of this disclosure provides an electronic device including the above-described sound absorber to absorb a sound at a time of an operation.

DETAILED DESCRIPTION

Figure 1A:
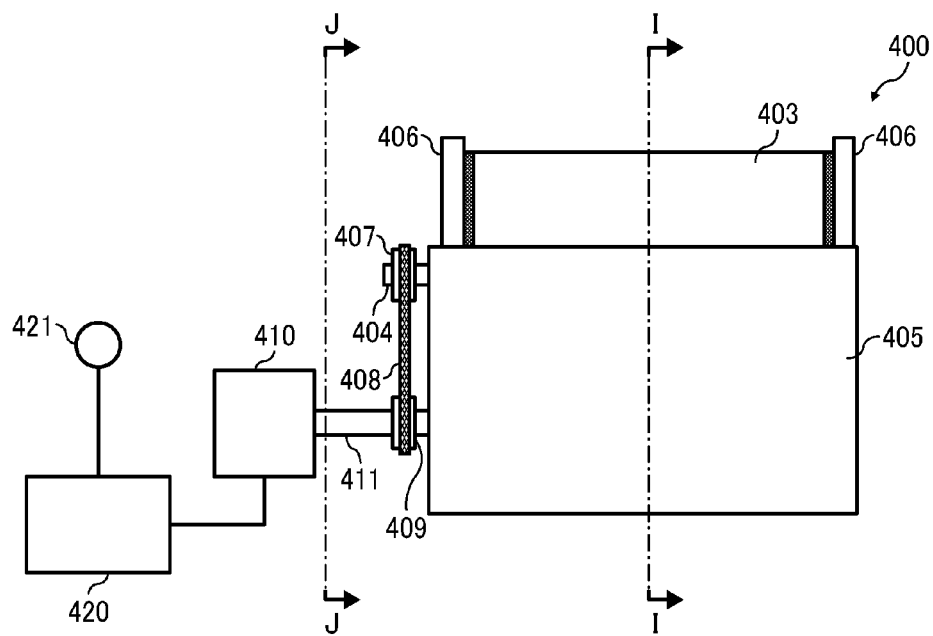
FIG. 1A is a side view illustrating a movable sound absorber according to an embodiment of this disclosure.

It will be understood that if an element or layer is referred to as being "on", "against", "connected to" or "coupled to" another element or layer, then it can be directly on, against, connected or coupled to the other element or layer, or intervening elements or layers may be present. In contrast, if an element is referred to as being "directly on", "directly connected to" or "directly coupled to" another element or layer, then there are no intervening elements or layers present. Like numbers referred to like elements throughout. As used herein, the term "and/or" includes any and all combinations of one or more of the associated listed items.

Spatially relative terms, such as "beneath", "below", "lower", "above", "upper" and the like may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements describes as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors herein interpreted accordingly.

Although the terms first, second, etc. may be used herein to describe various elements, components, regions, layers and/or sections, it should be understood that these elements, components, regions, layer and/or sections should not be limited by these terms. These terms are used to distinguish one element, component, region, layer or section from another region, layer or section. Thus, a first element, component, region, layer or section discussed below could be termed a second element, component, region, layer or section without departing from the teachings of the present disclosure.

The terminology used herein is for describing particular embodiments and examples and is not intended to be limiting of exemplary embodiments of this disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Descriptions are given, with reference to the accompanying drawings, of examples, exemplary embodiments, modification of exemplary embodiments, etc., of an image forming apparatus according to exemplary embodiments of this disclosure. Elements having the same functions and shapes are denoted by the same reference numerals throughout the specification and redundant descriptions are omitted. Elements that do not demand descriptions may be omitted from the drawings as a matter of convenience. Reference numerals of elements extracted from the patent publications are in parentheses so as to be distinguished from those of exemplary embodiments of this disclosure.

This disclosure is applicable to any image forming apparatus, and is implemented in the most effective manner in an electrophotographic image forming apparatus.

In describing preferred embodiments illustrated in the drawings, specific terminology is employed for the sake of clarity. However, the disclosure of this disclosure is not intended to be limited to the specific terminology so selected and it is to be understood that each specific element includes any and all technical equivalents that have the same function, operate in a similar manner, and achieve a similar result.

Referring now to the drawings, wherein like reference numerals designate identical or corresponding parts throughout the several views, preferred embodiments of this disclosure are described.

Now, a description is given of an electrophotographic image forming apparatus 1 for forming images by electrophotography. Hereinafter, the electrophotographic image forming apparatus 1 is referred to as the image forming apparatus 1.

It is to be noted that identical parts are given identical reference numerals and redundant descriptions are summarized or omitted accordingly.

The image forming apparatus 1 may be a copier, a facsimile machine, a printer, a multifunction peripheral or a multifunction printer (MFP) having at least one of copying, printing, scanning, facsimile, and plotter functions, or the like. According to the present example, the image forming apparatus 1 is an electrophotographic copier that forms toner images on recording media by electrophotography.

It is to be noted in the following examples that: the term "image forming apparatus" indicates an apparatus in which an image is formed on a recording medium such as paper, OHP (overhead projector) transparencies, OHP film sheet, thread, fiber, fabric, leather, metal, plastic, glass, wood, and/or ceramic by attracting developer or ink thereto; the term "image formation" indicates an action for providing (i.e., printing) not only an image having meanings such as texts and figures on a recording medium but also an image having no meaning such as patterns on a recording medium; and the term "sheet" is not limited to indicate a paper material but also includes the above-described plastic material (e.g., a OHP sheet), a fabric sheet and so forth, and is used to which the developer or ink is attracted. In addition, the "sheet" is not limited to a flexible sheet but is applicable to a rigid plate-shaped sheet and a relatively thick sheet.

Further, size (dimension), material, shape, and relative positions used to describe each of the components and units are examples, and the scope of this disclosure is not limited thereto unless otherwise specified.

Further, it is to be noted in the following examples that: the term "sheet conveying direction" indicates a direction in which a recording medium travels from an upstream side of a sheet feeding passage to a downstream side thereof; the term "width direction" indicates a direction basically perpendicular to the sheet conveying direction.

At first, a description is given of a basic configuration of the image forming apparatus 1 according to the present embodiment of this disclosure.

Figure 2:
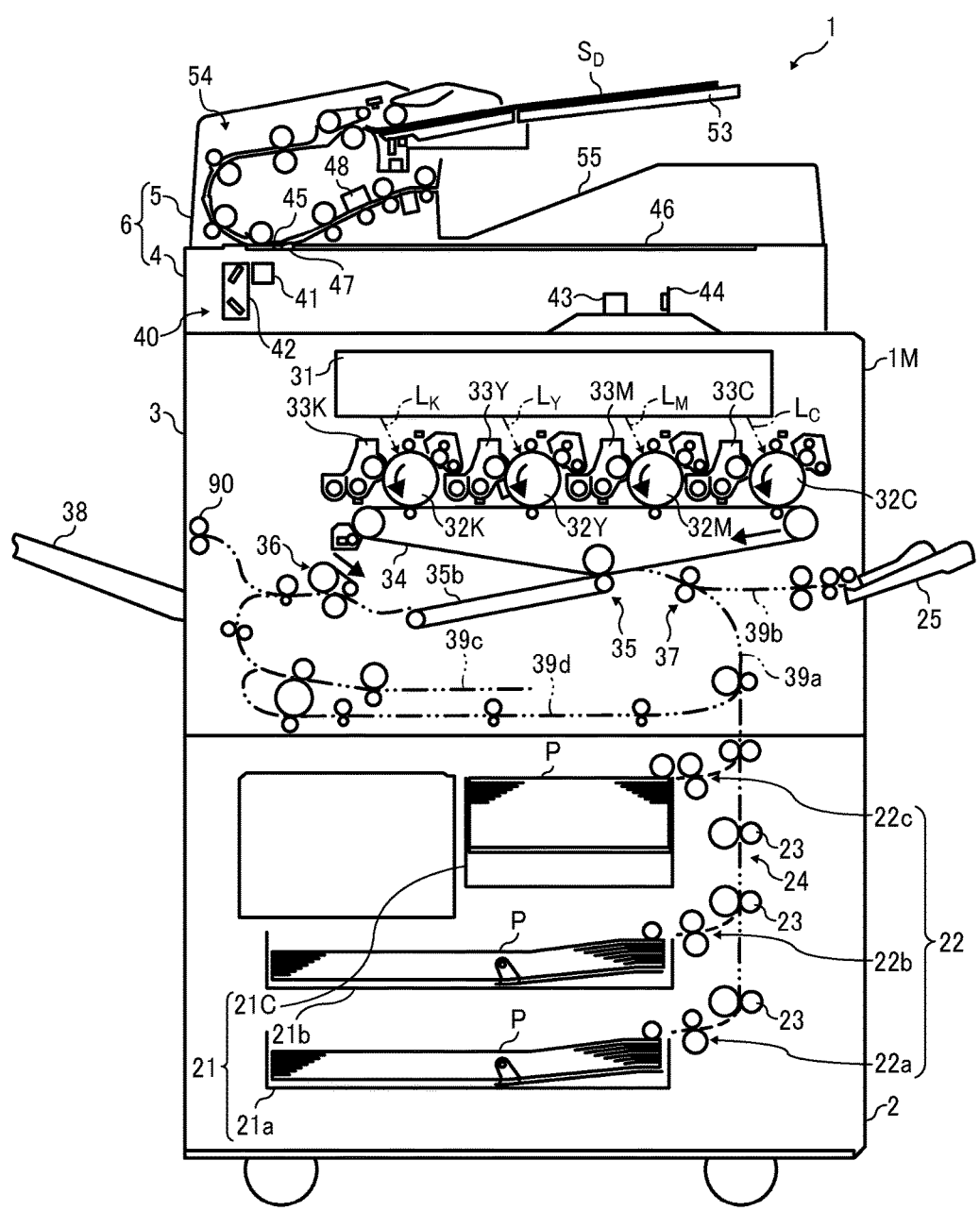
FIG. 2 is a schematic diagram illustrating an image forming apparatus according to an embodiment of this disclosure.

FIG. 2 is a schematic diagram illustrating the image forming apparatus 1 according to an embodiment of this disclosure. The image forming apparatus 1 includes an image forming device 3 as image forming means, a transfer sheet feeder 7, and a document conveying and reading unit 6. The document conveying and reading unit 6 as document conveying and reading means includes a scanner 4 as a document reading device secured onto the image forming device 3, and an automatic document feeder (ADF) 5 as a sheet feeder supported by the scanner 4.

The transfer sheet feeder 7 includes a plurality of stages of transfer sheet feed trays 21 (21a, 21b, and 21c), each of which accommodates cut sheet-like transfer sheets P in a layered manner. In each of the individual transfer sheet feed trays 21 (21a, 21b, and 21c), the transfer sheet P (for example, white paper) having a sheet size previously selected from a plurality of sheet sizes in advance is accommodated in a longitudinal or lateral sheet feeding direction.

The transfer sheet feeder 7 includes transfer sheet feeding devices 22 (21a, 21b, and 21c) that sequentially pickup, separate, and feed the transfer sheets P accommodated in the transfer sheet feed trays 21 (21a, 21b, and 21c) from respective uppermost layer sides. The transfer sheet feeder 7 further includes various conveyance rollers 23, and these conveyance rollers 23 form a transfer sheet feeding passage 24 on which the transfer sheets P fed from the individual transfer sheet feeding devices 22 (21a, 21b, and 21c) to a predetermined image forming position of the image forming device 3.

The image forming device 3 includes an exposure device 31 as latent image forming means, and drum-like photoconductors 32 (K, Y, M, and C) as latent image bearers. Further, the image forming device 3 includes developing devices 33 (K, Y, M, and C) with which toners of colors including black (K), yellow (Y), magenta (M), and cyan (C) are filled. Further, the image forming device 3 includes an intermediate transfer belt 34 as an intermediate transfer body, a secondary transfer device 35 that transfers a toner image on the intermediate transfer belt 34 to the transfer sheet P, and a fixing device 36 that fixes the toner image transferred on the transfer sheet P to the transfer sheet P.

The exposure device 31 generates laser light beams $L_K$, $L_Y$, $L_M$, and $L_C$ to expose respective colors on the basis of an image read in the scanner 4, for example. Further, the exposure device 31 exposes the photoconductors 32 (K, Y, M, and C) of the colors with the laser light beams $L_K$, $L_Y$, $L_M$, and $L_C$ to form electrostatic latent images of the colors corresponding to the read image on surface layer portions of the individual photoconductors 32 (K, Y, M, and C).

The developing devices 33 (K, Y, M, and C) bring toners in a thin layer manner close to the facing photoconductors 32 (K, Y, M, and C), respectively, and supply the toners to the electrostatic latent images on the surfaces of the photoconductors 32 (K, Y, M, and C) to develop the images.

In the image forming device 3, primary transfer is performed such that the toner images developed on the individual photoconductors 32 (K, Y, M, and C) are superimposed on the intermediate transfer belt 34, and a color toner image is formed on the intermediate transfer belt 34. The color toner image is secondarily transferred from the intermediate transfer belt 34 to the transfer sheet P in a secondary transfer nip region where a transfer conveyance belt 35b of the secondary transfer device 35 arranged below the intermediate transfer belt 34 and the intermediate transfer belt 34 are in contact. The transfer sheet P onto which the color toner image is transferred is conveyed to the fixing device 36 by the transfer conveyance belt 35b of the secondary transfer device 35. The color toner image on the transfer sheet P is melted by application of heat and pressure of the fixing device 36, and the color toner image is fixed to the transfer sheet P. A color image is recorded on the transfer sheet P.

The image forming device 3 includes a transfer sheet conveying passage 39a on which the transfer sheet P fed from the transfer sheet feeder 7 through the transfer sheet feeding passage 24 is conveyed toward the secondary transfer nip region. In this transfer sheet conveying passage 39a, a conveyance timing and a conveying speed of the transfer sheet P are adjusted in a pair of registration rollers 37, first. After the transfer sheet P passes through the secondary transfer nip region and the fixing device 36 in synchronization with a belt speed of the intermediate transfer belt 34 and a belt speed of the transfer conveyance belt 35b, the transfer sheet P is ejected onto a sheet ejection tray 38 with a pair of sheet ejection rollers 90.

The image forming device 3 includes a transfer sheet bypass passage 39b through which the transfer sheet P placed on a bypass tray 25 is fed to the transfer sheet conveying passage 39a upstream of the pair of registration rollers 37.

A switchback conveying passage 39c and an inverse conveying passage 39d including a plurality of conveyance rollers, and conveyance guides are arranged below the secondary transfer device 35 and the fixing device 36.

When forming images on both surfaces of the transfer sheet P, switchback conveying is performed in the switchback conveying passage 39c, where the transfer sheet P with one surface to which the image has been fixed is brought to enter from one end (the left-side end portion in FIG. 2), and then the transfer sheet P is moved back (moved to a reverse direction to the direction at the time of entry). The inverse conveying passage 39d causes the front and back of the transfer sheet P to be inverted, the transfer sheet P having been switched back by the switchback conveying passage 39c, and feeds the transfer sheet P to the pair of registration rollers 37 again.

One surface of the transfer sheet P has been applied in the switchback conveying passage 39c and the inverse conveying passage 39d. The transfer sheet P is inverted upside down after its travel direction is switched to a reverse direction, and then enters the secondary transfer nip region again. After the secondary transfer process and the fixing process for an image are applied to the other surface of the transfer sheet P, the transfer sheet P is ejected onto the sheet ejection tray 38.

The scanner 4 includes a first carriage 41 on which a lighting unit and a mirror member are mounted, a second carriage 42 on which a mirror member is mounted, an image forming lens 43, an imaging unit 44, and a first contact glass 45. Further, the scanner 4 includes a second contact glass 46 on which the document sheet $S_D$ is placed, and a contact member 47 that performs contacting and positioning of one side of the document sheet $S_D$. The scanner 4 configures a first side reader 40 that reads the image on the first surface of the document sheet $S_D$ conveyed on the first contact glass 45. The first surface referred to here is one surface of automatically conveyed document sheet $S_D$, for example, an image surface on a surface side.

The first carriage 41 is provided below the first contact glass 45 and the second contact glass 46 in a movable and position-controllable manner in a right and left direction in FIG. 2. Then, emitted light from a light source included in the lighting unit is reflected at the mirror member, and an exposure surface side of the document sheet $S_D$ is irradiated with the reflection light.

The reflection light reflected at the exposure surface of the document sheet $S_D$ enters the image forming lens 43 through the mirror members mounted on the first carriage 41 and the second carriage 42, and an image is formed by the image forming lens 43 and the formed image is read in the imaging unit 44.

The scanner 4 can expose and scan the image surface of the document sheet $S_D$ placed on the second contact glass 46 while moving the first carriage 41 and the second carriage 42 at a speed ratio of "2:1" in a light source lighting state. Then, the scanner 4 reads the document image with the imaging unit 44 at the time of the exposure and scanning, thereby exhibiting a fixed document reading function (that is, a flatbed scanner function).

The scanner 4 stops the first carriage 41 in a fixed position immediately below the first contact glass 45. Then, the scanner 4 exhibits a moving document reading function (that is, a DF scanner function) to read the image on the first surface of the document sheet $S_D$ being automatically conveyed without moving an optical system including the light source, a reflection mirror, and the like.

Further, the image forming apparatus 1 includes a second side reader 48 built in the ADF 5, in addition to the first side reader 40 in the scanner 4. The second side reader 48 scans a second surface of the document sheet $S_D$, for example, an image surface on the back side, of the document sheet $S_D$ after having passed through the first contact glass 45.

The ADF 5 is connected to the scanner 4 arranged above the image forming device 3 of the image forming apparatus 1 in an openable and closable manner through a hinge mechanism. The ADF 5 is operated to rotate between an open position where the first contact glass 45 and the second contact glass 46 in the scanner 4 are exposed, and a close position where the first contact glass 45 and the second contact glass 46 are covered.

Next, a description is given of the ADF 5.

Figure 3:
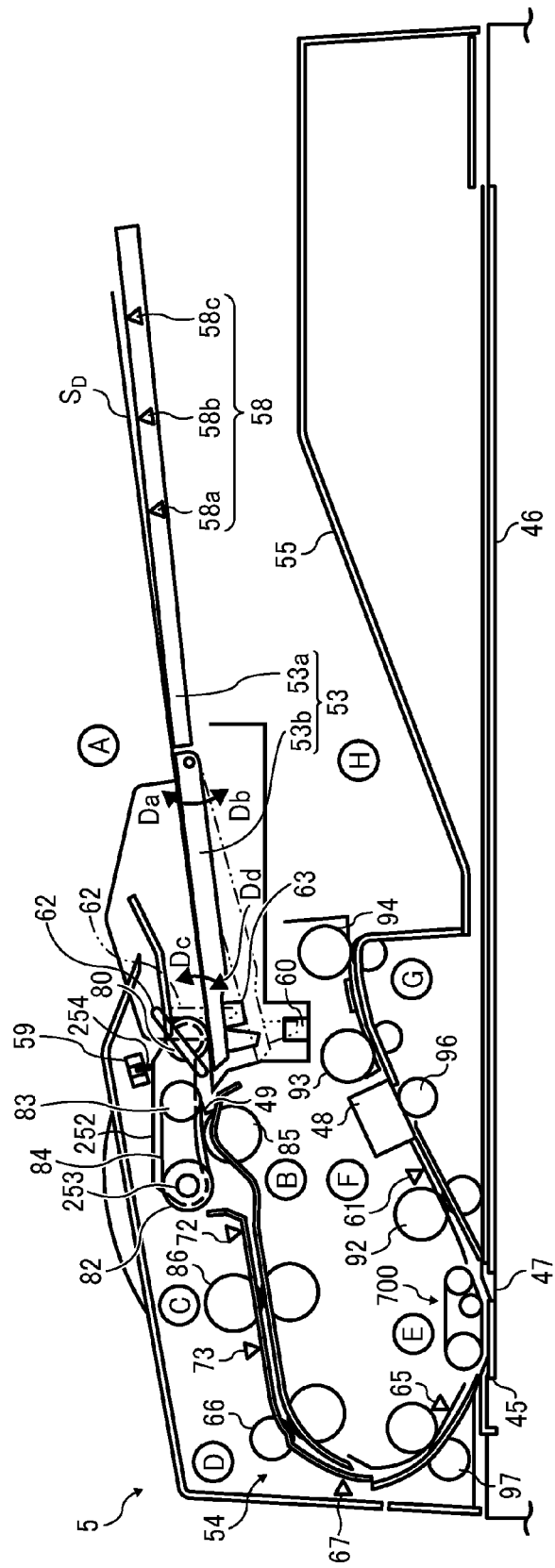
FIG. 3 is a diagram illustrating a schematic configuration of an automatic document feeder (ADF) according to an embodiment of this disclosure and an upper part of a scanner.

FIG. 3 is an enlarged configuration view illustrating a main part configuration of the ADF 5 together with an upper part of the scanner 4. The ADF 5 includes a document setting part A, a separating and feeding part B, a registration part C, a turning part D, a first reading and conveying part E, a second reading and conveying part F, a sheet ejecting part G, a stacking part H, and the like. A document conveying unit 54 of the ADF 5 of the present embodiment is a part that configures a passage from a detection position by a document contact sensor 72 downstream of the separating and feeding part B to a pair of reading inlet rollers 97, on which the document sheet $S_D$ is conveyed.

The document conveying and reading unit 6 including the ADF 5 conveys the document sheet $S_D$ as a recording medium to be read to a first side reader 40 and a second side reader 48 as a fixed reading device, and reads the image while conveying the document sheet $S_D$ at a predetermined speed.

The document setting part A includes a document placing table 53 on which a bundle of the document sheet $S_D$ is set such that first surfaces of the document sheet $S_D$ face upward. The separating and feeding part B includes a pickup roller 80, a separation belt 84, and a reverse roller 85, and separates and feeds the document sheet $S_D$ one by one from the bundle of the document sheet $S_D$ set on the document placing table 53. The registration part C has a function to adjust and primarily contact the fed document sheet $S_D$ and a function to pull out and convey the adjusted document sheet $S_D$. The turning part D includes a curved conveying part curved in a C-shape manner, and makes the document sheet $S_D$ conveyed in the curved conveying part turned and inverted upside down while folding back the document sheet $S_D$, and conveys the document sheet $S_D$ to cause the first surface to face the first side reader 40 (see FIG. 2) below.

In the first reading and conveying part E, the document sheet $S_D$ is conveyed on the first contact glass 45 including a platen glass. Then, the first surface of the document sheet $S_D$ is read, while being conveyed, by the first side reader 40 arranged inside the scanner 4 from below the first contact glass 45.

The second reading and conveying part F causes the second surface of the document sheet $S_D$ to be read by the second side reader 48 while conveying the document sheet $S_D$ having passed through the reading position by the first side reader 40 with a second reader opposing roller 96 arranged below the second side reader 48. Further, the sheet ejecting part G discharges the document sheet $S_D$ having passed through the reading position by the first side reader 40 and the reading position by the second side reader 48 toward the stacking part H outside the apparatus. The stacking part H loads and holds the document sheet $S_D$ after completion of reading on a document stacking table 55.

Figure 4:
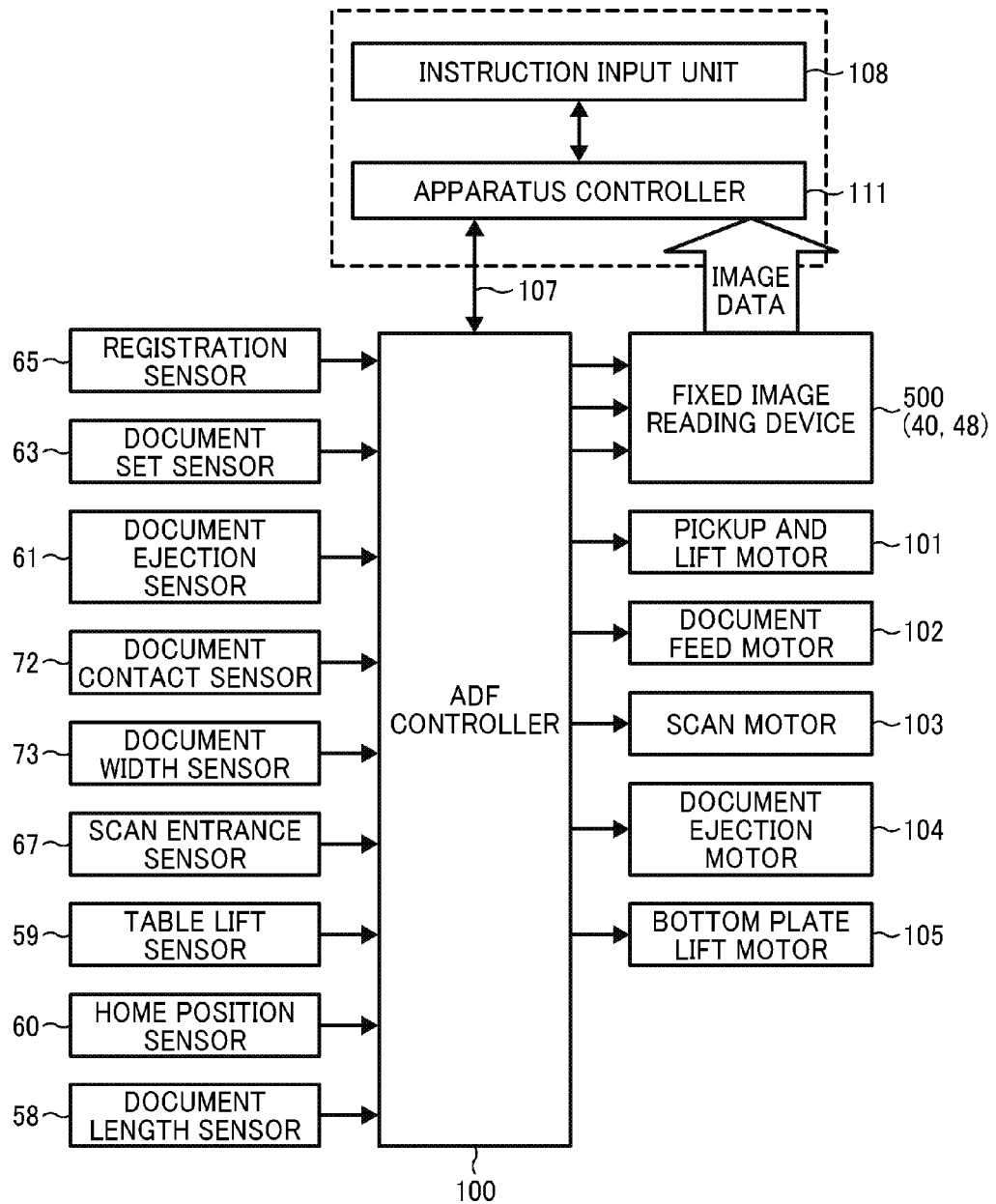
FIG. 4 is a block diagram illustrating a controller of the ADF.

FIG. 4 is a block diagram illustrating a controller of the entire ADF 5.

An ADF controller 100 as a control unit of the ADF 5 controls a series of operations of motors, various sensors, and a fixed image reading device 500. Motors (a pickup and lift motor 101, a document feed motor 102, a scan motor 103, a document ejection motor 104, and a bottom plate lift motor 105) are drive units that perform a conveying operation of the document, and the fixed image reading device 500 is the first side reader 40 or the second side reader 48.

Figure 5:
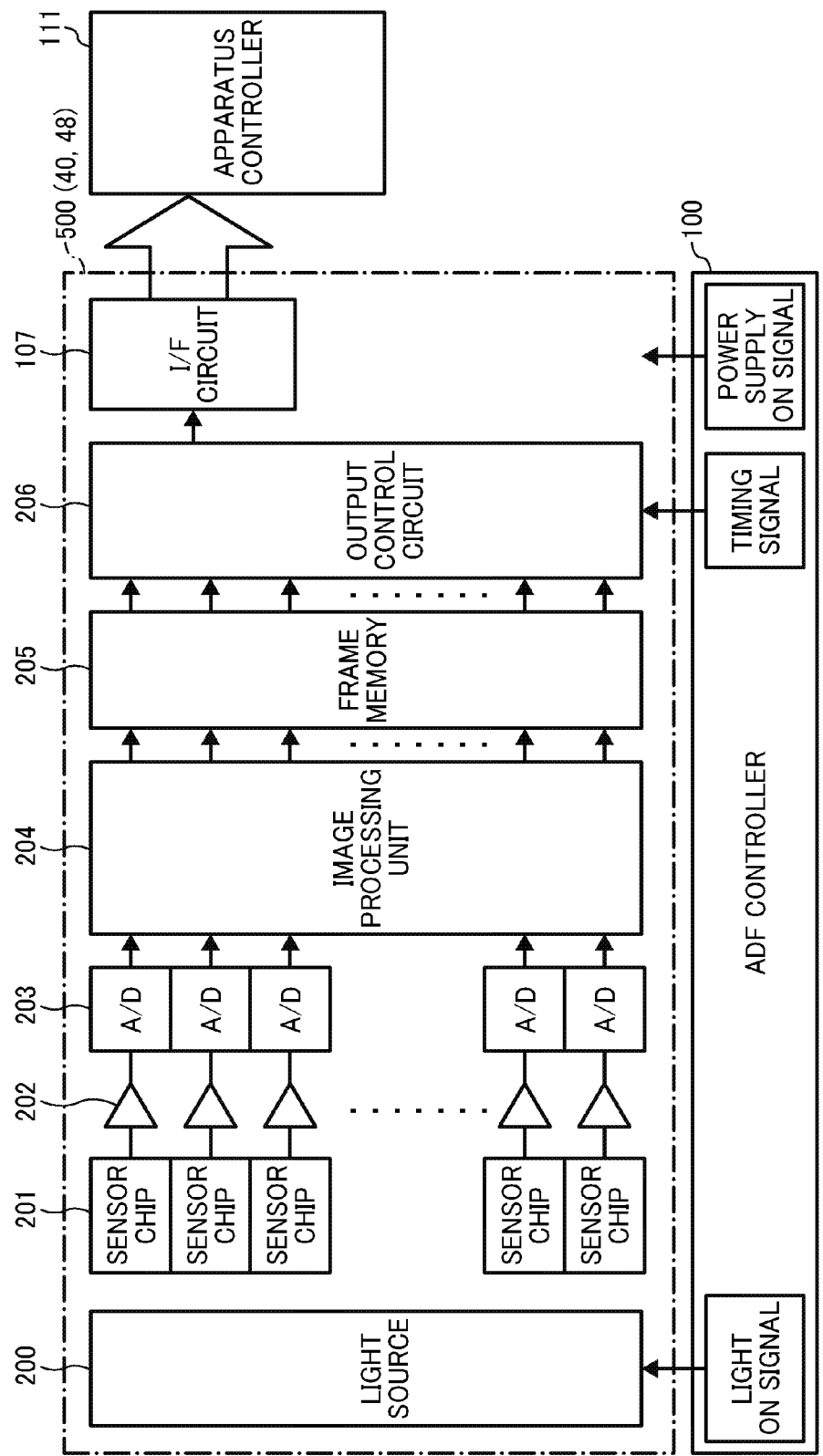
FIG. 5 is a block diagram illustrating a main part of an electric circuit of a fixed image reader included in the image forming apparatus.

FIG. 5 is a block diagram illustrating a main part of an electric circuit of the fixed image reading device 500.

The fixed image reading device 500 includes a light source 200, a sensor chip 201, an image processing unit 204, a frame memory 205, an output control circuit 206, an interface circuit (hereinafter, referred to as an I/F circuit 107).

The light source 200 includes an LED array, a fluorescent light, or a cold cathode tube. A plurality of the sensor chips 201 are arranged side by side in a main-scanning direction (a direction corresponding to a document width direction). A plurality of OP amplifier circuits 202 are connected to the plurality of sensor chips 201, respectively. A plurality of A/D converters 203 are connected to the plurality of OP amplifier circuits 202, respectively.

The sensor chip 201 includes a photoelectric conversion element, that is, an unmagnified contact image sensor, and a condenser lens. Prior to entry of the document sheet $S_D$ to the reading position by the fixed image reading device 500, a lighting signal is sent from the ADF controller 100 to the light source 200. Accordingly, the light source 200 emits laser light, and irradiates the surface (the first surface in the case of the first side reader 40, and the second surface in the case of the second side reader 48) of the document with the light. Reflection light reflected at the surface of the document sheet $S_D$ is condensed in the photoelectric conversion element by the condenser lens and is read as image information in each of the plurality of sensor chips 201. The image information read in the respective sensor chips 201 is amplified by the OP amplifier circuits 202, and is then converted into digital image information by the A/D converters 203.

The thus obtained digital image information is inputted to the image processing unit 204, and is temporarily stored in the frame memory 205 after shading correction and other processes are applied. Thereafter, the digital image information is converted by the output control circuit 206 into a data format receivable by an apparatus controller 111 (a control unit of a main body of the image forming apparatus 1), and is output to the apparatus controller 111 through the I/F circuit 107 as image data. A timing signal for notifying when a leading end of the document sheet $S_D$ reaches the reading position by the fixed image reading device 500, the light on signal of the light source, a power supply on signal are output from the ADF controller 100. The image data on and after the timing of the timing signal for notifying when the leading end of the document sheet $S_D$ reaches the reading position is treated as effective data.

The bundle of the document sheet $S_D$ to be read is set on the document placing table 53 in a state of having the first surface face upward. The document placing table 53 includes a movable document table 53b that supports a leading end side of the document sheet $S_D$, and is swingable in arrows Da-Db directions in FIG. 3 according to the thickness of the bundle of the document sheet $S_D$, and a fixed document table 53a that supports a trailing end side of the document sheet $S_D$.

Further, the document placing table 53 is provided with side guides respectively contacting against both ends of the document sheet $S_D$ in a width direction (a direction perpendicular to the conveying direction of the document sheet $S_D$ and is a direction perpendicular to the sheet surface of FIG. 3). Then, when the document sheet $S_D$ are set on the document placing table 53, the side guides respectively contact against the both ends of the document sheet $S_D$ in the width direction, so that positioning of the document sheet $S_D$ in the width direction is performed.

A set feeler 62 as a lever member is swingably arranged above the movable document table 53b. The set feeler 62 is in the position illustrated by the broken line in FIG. 3 in a state in which no document sheet $S_D$ are set on the document placing table 53. This position is a detection position by a document set sensor 63, and no document sheet $S_D$ being set on the document placing table 53 is known as the document set sensor 63 detects the set feeler 62.

When the document sheet $S_D$ are set on the document placing table 53, the leading ends of the document sheet $S_D$ push up the set feeler 62. With the pushing up of the set feeler 62 by the document sheet $S_D$, the set feeler 62 is moved from the detection position of the document set sensor 63, and the document sheet $S_D$ being set is detected as the document set sensor 63 detects no set feeler 62. Then, the document set sensor 63 transmits a detection signal to the ADF controller 100. The detection signal is transmitted from the ADF controller 100 to the apparatus controller 111 of the document conveying and reading unit 6 through the I/F circuit 107.

In the fixed document table 53a, a reflection-type photosensor that detects the length of the document sheet $S_D$ in the conveying direction or a plurality of document length sensors 58 (58a, 58b, and 58c) including actuator-type sensors that can detect even one sheet of document is arranged. A rough length of the document sheet $S_D$ in the conveying direction is determined by these document length sensors. The plurality of document length sensors 58 are disposed such that the sensor arrangement determines at least the longitudinal or lateral size of documents having the same size.

A pickup roller 80 is arranged above the movable document table 53b. The pickup roller 80 is driven to rotate as a driving force is transmitted from the document feed motor 102. Further, the separation belt 84 and the reverse roller 85 that configure a separation nip region as a separating part are driven to rotate as the driving force is transmitted from the document feed motor 102.

The movable document table 53b swings in arrows Da-Db directions in FIG. 3 by a cam mechanism driven by driving of the bottom plate lift motor 105. When the document sheet $S_D$ having been set on the document placing table 53 are detected by the set feeler 62 and the document set sensor 63, the ADF controller 100 normally rotates the bottom plate lift motor 105. When the bottom plate lift motor 105 is normally rotated, the movable document table 53b is rotated in arrow Da direction in FIG. 3, and a free end side (a left side in FIG. 3) of the movable document table 53b elevates. The bundle of the document sheet $S_D$ set on the document placing table 53 also elevates together with the free end side of the movable document table 53b, and an uppermost surface of the bundle of the document sheet $S_D$ comes in contact with the pickup roller 80.

The pickup roller 80 is rotatably supported by one end (a right end in FIG. 3) of a pickup bracket 252. Further, the pickup bracket 252 is rotatable in arrows Dc-Dd directions in FIG. 3 around a document sheet feeding unit drive shaft 253 on the other end portion side (a left end portion side in FIG. 3). The pickup bracket 252 is rotated in arrows Dc-Dd directions in FIG. 3 by a cam mechanism driven by the pickup and lift motor 101. Then, the pickup roller 80 is moved in arrows Dc-Dd directions in FIG. 3 as the pickup bracket 252 is rotated in arrows Dc-Dd directions in FIG. 3.

Further, the pickup bracket 252 that supports the pickup roller 80 includes a bracket detaction target 254. Further, a table lift sensor 59 is arranged in a frame of a main body of the ADF 5 in a position above the pickup bracket 252.

The table lift sensor 59 is a sensor that detects whether the pickup roller 80 is in a lifting position by detecting existence or non-existence of the bracket detaction target 254 in the detection position. The table lift sensor 59 is a light transmission-type optical sensor that detects whether light emitted from a light emitting portion is shielded in a detection position between a light emitting portion and a light receiving portion. Then, the bracket detaction target 254 being in the detection position of the table lift sensor 59 is detected as the bracket detaction target 254 shields the light in the detection position.

When the pickup roller 80 is pushed by an upper surface of the document sheet $S_D$ on the movable document table 53b as the movable document table 53b elevates in a state in which the pickup roller 80 is rotated and lowers in arrow Dd direction in FIG. 3, the pickup roller 80 is rotated and lifted in arrow Dc direction in FIG. 3. The table lift sensor 59 can detect that the movable document table 53b has elevated to an upper limit by detecting the above operation. With the detection of the lifting of the movable document table 53b to the upper limit, the pickup and lift motor 101 is stopped and the bottom plate lift motor 105 is stopped, and the document sheet $S_D$ is nipped by the movable document table 53b and the pickup roller 80.

The table lift sensor 59 is a sensor that detects a bottom plate having elevated to the upper limit to detect an upper surface of the bundle of the document sheet $S_D$ being kept to an proper sheet feeding height. When the table lift sensor 59 becomes an ON state to detect the bracket detaction target 254, rising of the movable document table 53b as the bottom plate is stopped and the sheet feeding is repeated. By repetition of the sheet feeding, an upper surface position of the bundle of the document sheet $S_D$ lowers. When the table lift sensor 59 becomes OFF in the detection state, control to cause the movable document table 53b to rise so that the table lift sensor 59 becomes ON again is repeated. With such control, the upper surface position of the bundle of the document sheet $S_D$ can be constantly maintained to the height suitable for sheet feeding.

When the whole document sheet $S_D$ set on the document placing table 53 have been fed, the bottom plate lift motor 105 is reversely rotated, and the movable document table 53b is lowered to a home position so that the next bundle of the document sheet $S_D$ can be set. When the movable document table 53b is lowered to the home position, a feeler provided in a lower part of the movable document table 53b is detected by a home position sensor 60.

In the present embodiment, both of the movable document table 53b and the pickup roller 80 include a lifting mechanism. However, as the mechanism to nip the document sheet $S_D$, a configuration including the lifting mechanism only in one of the movable document table 53b and the pickup roller 80 may be employed.

A user specifies a duplex scanning mode or a single side scanning mode, and presses a copy start button on an instruction input unit 108 in a state in which the document sheet $S_D$ are set on the document placing table 53. When the copy start button is pressed, a document sheet feeding signal is transmitted from the apparatus controller 111 to the ADF controller 100 as a control unit of the ADF 5 through the I/F circuit 107. Accordingly, the document feed motor 102 is driven in a normal direction. With the normal rotation driving of the sheet feed motor 102, the pickup roller 80 is driven and rotated, and picks up several document sheet $S_D$ (ideally, one document sheet $S_D$) on the document placing table 53. The rotating direction of the pickup roller 80 at this time is a direction (a clockwise direction in FIG. 3) into which the uppermost document sheet $S_D$, of the bundle of the document sheet $S_D$ on the document placing table 53 is conveyed, toward a separation nip region described below.

Here, in a case of setting either the duplex scanning mode or the single side scanning mode, the same setting may be made to the whole document sheet $S_D$ set on the document placing table 53, or different setting may be made to respective (first, second, and n-th) document sheet $S_D$. As the different setting, for example, the duplex scanning mode is set to the first and tenth document sheet $S_D$, and the single side scanning mode is set to the other document sheet $S_D$, of a total of ten document sheet $S_D$.

The document sheet $S_D$ sent by the pickup roller 80 is sent to a separation inlet 49 of the separation nip as a contact position of the separation belt 84 and the reverse roller 85. The separation belt 84 is stretched over the sheet feeding drive roller 82 and the sheet feeding driven roller 83, and is endlessly moved in the sheet feeding direction (the clockwise direction in FIG. 3) by rotation of the sheet feeding drive roller 82 associated with the normal rotation of the sheet feed motor 102.

The reverse roller 85 is in contact with a lower stretched surface of the separation belt 84. Driving to rotate in a reverse direction (the clockwise direction in FIG. 3) to the sheet feeding direction is transmitted to the reverse roller 85 by the normal rotation of the sheet feed motor 102. As described above, the surface moving direction in the separation nip region of the separation belt 84 and the reverse roller 85 is the reverse direction, and thus the uppermost document sheet $S_D$ of the bundle of the document sheets $S_D$ and the document sheet $S_D$ under the uppermost document sheet $S_D$ are separated, and the uppermost document sheet $S_D$ can be fed.

To be more specific, in the separation nip region as the contact part of the separation belt 84 and the reverse roller 85, the surface of the separation belt 84 is moved in the sheet feeding direction. Meanwhile, the surface of the reverse roller 85 is intended to be moved in the reverse direction to the sheet feeding direction. However, a torque limiter is provided in a drive transmission part of the reverse roller 85. Therefore, if a force of the surface of the reverse roller 85 toward the sheet feeding direction is larger than an upper limit torque of the torque limiter, the reverse roller 85 is rotated in a counterclockwise direction in FIG. 3 so that the surface is moved in the sheet feeding direction.

The reverse roller 85 is in contact with the separation belt 84 with a predetermined pressure. The reverse roller 85 is rotated together with the separation belt 84 or the document sheet $S_D$ in a state in which the reverse roller 85 is directly in contact with the separation belt 84, or a state in which the reverse roller 85 is in contact with the separation belt 84 through only one document sheet $S_D$ (in a state where only one document sheet $S_D$ is nipped in the separation nip). That is, the reverse roller 85 is rotated in the counterclockwise direction in FIG. 3 as the sheet feeding direction.

Meanwhile, when two or more document sheet $S_D$ are nipped and held in the separation nip region, the torque limiter is set to make corotation force lower than the upper limit torque of the torque limiter. Therefore, the reverse roller 85 is driven and rotated in the clockwise direction in FIG. 3 as a reverse direction to a corotating direction. When the reverse roller 85 is driven to rotate in the reverse direction to the corotation direction, moving force in the reverse direction to the sheet feeding direction is provided to the document sheet $S_D$ other than the uppermost document sheet $S_D$, of the document sheets $S_D$ conveyed toward the separation nip, by the reverse roller 85. Accordingly, extra document sheets $S_D$ are pushed back, and the uppermost document sheet $S_D$ is separated from the plurality of document sheets $S_D$, and multi-feed is prevented.

The document sheet $S_D$ separated to one sheet by the action of the separation belt 84 and the reverse roller 85 enters the registration part C. Then, the document sheet $S_D$ is further sent by the separation belt 84, a leading end is detected by the document contact sensor 72, the document sheet $S_D$ further proceeds, and the leading end of the document sheet $S_D$ contacts against the pair of pullout rollers 86, rotation of which is stopped. The document feed motor 102 being driven at this time is driven for a predetermined time from the detection of the leading end of the document sheet $S_D$ by the document contact sensor 72 and is then stopped. Accordingly, the document sheet $S_D$ is sent by a predetermined distance from the detection position by the document contact sensor 72. Then, as a result, conveyance of the document sheet $S_D$ by the separation belt 84 is stopped in a state in which the document sheet $S_D$ is pushed against the pair of pullout rollers 86 with a predetermined amount of bending.

The pickup and lift motor 101 is rotated when the leading end of the document sheet $S_D$ is detected by the document contact sensor 72, so that the pickup roller 80 is retracted from the upper surface of the document sheet $S_D$ and the document sheet $S_D$ is sent by conveying force of the separation belt 84. Accordingly, the leading end of the document sheet $S_D$ enters a nip region formed by the upper and lower rollers of the pair of pullout rollers 86, and adjustment (skew correction) of the leading end of the document sheet $S_D$ is performed.

As described above, the pair of pullout rollers 86 is a pair of rollers having a skew correction function and for conveying the document sheet $S_D$, skew of which has been corrected after separation, to the pair of intermediate rollers 66. When the document feed motor 102 is reversely driven, one of the two rollers that configure the pair of pullout rollers 86 is driven and rotated to convey the document sheet $S_D$. When the document feed motor 102 is reversely driven, driving is input to the pair of pullout rollers 86 and the pair of intermediate rollers 66, and no driving is input to the pickup roller 80, the separation belt 84, and the reverse roller 85. That is, when the document feed motor 102 is normally rotated, driving is transmitted to the pickup roller 80, the separation belt 84, and the reverse roller 85. When the document feed motor 102 is reversely rotated, driving is transmitted to the pair of pullout rollers 86 and the pair of intermediate rollers 66.

The document sheet $S_D$ sent by the pair of pullout rollers 86 passes through immediately below a document width sensor 73. The document width sensor 73 is a sensor having a plurality of sheet detecting sensors, each of which includes a reflection-type photosensor is arranged in a document width direction (a direction perpendicular to the sheet surface of FIG. 3). Then, the size of the document sheet $S_D$ is detected on the basis of which one of the sheet detecting sensors detects the document sheet $S_D$. Further, the length of the document sheet $S_D$ in the sheet conveying direction is detected from a motor pulse on the basis of timing from when the leading end of the document sheet $S_D$ is detected by the document contact sensor 72 to when the document sheet $S_D$ becomes undetected by the document contact sensor 72 (when the trailing end of the document sheet $S_D$ passes through).

The document sheet $S_D$ conveyed by the driving and rotation of the pair of pullout rollers 86 and the pair of intermediate rollers 66 enters the turning part D in which the document sheet $S_D$ is conveyed by the pair of intermediate rollers 66 and the pair of reading inlet rollers 97.

In the ADF 5, when the document sheet $S_D$ is conveyed from the registration part C to the turning part D by the driving and rotation of the pair of pullout rollers 86 and the pair of intermediate rollers 66, the conveying speed in the registration part C is set faster than the conveying speed in the first reading and conveying part E. Accordingly, a processing time to send the document sheet $S_D$ to the first reading and conveying part E is shortened.

When the leading end of the document sheet $S_D$ is detected by a scan entrance sensor 67, deceleration of the document feed motor 102 is started. At the same time, the scan motor 103 is normally driven. When the scan motor 103 is normally driven, the pair of reading inlet rollers 97, a pair of reading outlet rollers 92, and a pair of second reading outlet rollers 93 are driven and rotated in the conveying direction. When the document feed motor 102 is decelerated, a rotating speed of the pair of intermediate rollers 66 driven and rotated by the document feed motor 102 is decreased. Accordingly, before the leading end of the document sheet $S_D$ enters a nip region formed by the upper and lower rollers of the pair of reading inlet rollers 97, the conveying speed of the document sheet $S_D$ is made to the same speed as the conveying speed in the first reading and conveying part E.

When the leading end of the document sheet $S_D$ from the turning part D toward the first reading and conveying part E is detected by a registration sensor 65, the ADF controller 100 decreases driving speeds of the motors using a predetermined time. Accordingly, the conveying speed of the document sheet $S_D$ is decreased in a predetermined conveyance distance. Then, the ADF controller 100 controls the document sheet $S_D$ to be temporarily stopped in front of a first reading position 700 where the image on the first surface of the document sheet $S_D$ is read by the first side reader 40. Further, together with the control of the temporary stop, the ADF controller 100 transmits a signal to stop the pair of registration rollers 37 to the apparatus controller 111 through the I/F circuit 107.

Then, upon receiving a reading start signal from the apparatus controller 111, the ADF controller 100 starts driving of the scan motor 103. At this time, the ADF controller 100 controls driving of the scan motor 103 such that the conveying speed of the document sheet $S_D$ rises to a predetermined conveying speed until the leading end of the document sheet $S_D$ stopped at the pair of registration rollers 37 reaches the first reading position 700. Accordingly, the document sheet $S_D$ is conveyed toward the first reading position 700 while the conveying speed is increased.

Next, a timing when the leading end of the document sheet $S_D$ reaches the first reading position 700, which is calculated on the basis of a pulse count of the scan motor 103, is detected. Then, the ADF controller 100 transmits a gate signal that indicates a sub-scanning direction effective image area of the first surface of the document sheet $S_D$ to the apparatus controller 111 at the detected timing. Transmission of the gate signal is continuously performed until the trailing end of the document sheet $S_D$ gets out of the first reading position 700, and the first surface of the document sheet $S_D$ is read by the first side reader 40.

Further, as illustrated in FIG. 3, an upper surface of the contact member 47 is inclined such that the height on the left end side becomes low. Accordingly, the leading end of the document sheet $S_D$ having passed through the first reading position 700 is scooped up by the inclination of the contact member 47 and goes toward a nip of the pair of reading outlet rollers 92.

The document sheet $S_D$ having passed through the first reading and conveying part E passes through the nip of the pair of reading outlet rollers 92, then the leading end is detected by a document ejection sensor 61, the document sheet $S_D$ is further conveyed to the second reading and conveying part F, and after that, the document sheet $S_D$ passes through the second reading and conveying part F and is conveyed to the sheet ejecting part G.

In the case of the single side scanning mode to read only one surface (the first surface) of the document sheet $S_D$, reading of the second surface of the document sheet $S_D$ by the second side reader 48 is unnecessary. Therefore, when the leading end of the document sheet $S_D$ is detected by the document ejection sensor 61, normal driving of the document ejection motor 104 is started, and the upper-side sheet ejection roller in FIG. 3 in a pair of document sheet ejection rollers 94 is driven and rotated in the counterclockwise direction in FIG. 3.

Further, a timing when the trailing end of the document sheet $S_D$ gets out of the nip region of the pair of document sheet ejection rollers 94 is calculated on the basis of a pulse count of the document ejection motor 104 from when the leading end of the document sheet $S_D$ is detected by the document ejection sensor 61. Then, a decrease in the driving speed of the document ejection motor 104 is started at a timing immediately before the trailing end of the document sheet $S_D$ gets out of a nip region of the pair of document sheet ejection rollers 94 on the basis of the calculation result. With the control of the deceleration, the document sheet $S_D$ discharged onto the document stacking table 55 is controlled to be ejected at a speed not to fly out of the document stacking table 55.

Meanwhile, in the case of the duplex scanning mode to read both surfaces (the first and second surfaces) of the document sheet $S_D$, control as follows is performed. That is, a timing until the leading end of the document sheet $S_D$ reaches the second side reader 48 after the leading end is detected by the document ejection sensor 61 is calculated on the basis of the pulse count of the scan motor 103. Then, at the timing, a gate signal indicating an effective image area in the sub-scanning direction on the second surface of the document sheet $S_D$ is transmitted from the ADF controller 100 to the apparatus controller 111. Transmission of the gate signal is continuously performed until the trailing end of the document sheet $S_D$ gets out of the second reading position by the second side reader 48, and the second surface of the document sheet $S_D$ is read by the second side reader 48.

The second side reader 48 as a reader includes a contact-type image sensor (CIS). Then, a coating process is applied to a reading surface with a view to preventing a reading streak due to adhering of a paste-like foreign substance to the reading surface, the foreign substance having been attached to the document sheet $S_D$. Further, the second reader opposing roller 96 as document supporting means that supports the document sheet $S_D$ from a non-reading surface side (the first surface side) is arranged in a position facing the second side reader 48 across the sheet feeding passage on which the document sheet $S_D$ passes through. The second reader opposing roller 96 restrains floating up of the document sheet $S_D$ in the second reading position with respect to the second side reader 48 and has a role to function as a reference white portion for acquiring shading data in the second side reader 48.

Further, in the present embodiment, the two fixed image reading device 500 including the first side reader 40 and the second side reader 48 are included as document reading devices that read the image on the conveyed document sheet $S_D$. A configuration to read images on both surfaces of the document sheet $S_D$ is not limited to the configuration with the two fixed image reading device 500. A configuration to switch back the document sheet $S_D$, the surface of which has been read by one fixed image reading device 500, and to read the back surface when the document sheet $S_D$ passes through the reading position of the fixed image reading device 500 again may be employed.

The document sheet $S_D$ conveyed on the sheet feeding passage in the ADF 5 is moved while sliding with guide members that form the sheet feeding passage, and thus sliding sound is generated. When such sliding sound is transmitted outside the image forming apparatus, the sliding sound may become a noise that provides a feeling of discomfort to people around the apparatus.

A comparative sound absorber having a configuration of Helmholtz resonator has different sound absorption efficiencies depending on the communication direction from a cavity to an outside of the comparative sound absorber and the position of a sound source with respect to the comparative sound absorber. Specifically, when the sound source exists on an extension line that extends from a communication portion in the communication direction, the sound absorption efficiency tends to increase. Therefore, as the position of the sound source shifts from the extension line in the communication direction, the sound absorption efficiency tends to decrease. Then, it is not a case in which the communication direction of the communication portion when the comparative sound absorber is installed in an image forming apparatus is a direction having a high sound absorption efficiency. When the communication direction is a direction having a low sound absorption efficiency, an abnormal sound that occurs during image formation is not sufficiently absorbed and is transmitted to the outside the image forming apparatus. This abnormal sound can be a noise that provides a feeling of discomfort to people around the image forming apparatus. Such an inconvenience may occur to an image forming apparatus or any other device as long as the device is a sound absorber that includes a cavity and a communication portion.

The ADF 5 of the present embodiment absorbs the sliding sound generated as the document sheet $S_D$ is conveyed, by being provided with a sound absorber having a Helmholtz resonator structure.

Figure 6A:
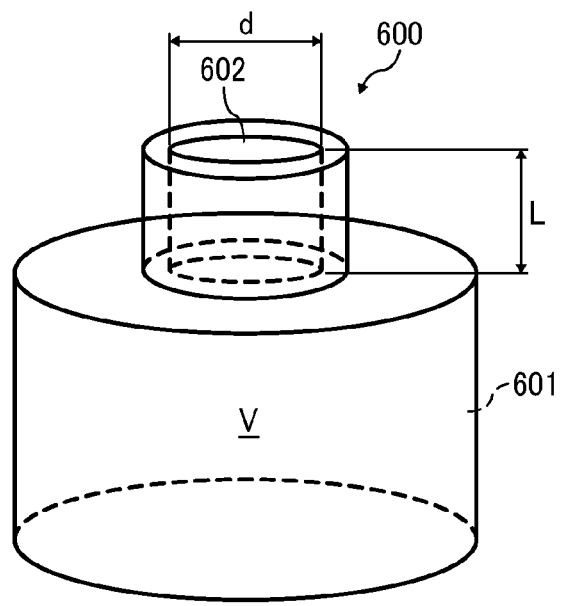
FIG. 6A is a diagram illustrating a sound absorber employing a Helmholtz resonator.
Figure 6B:
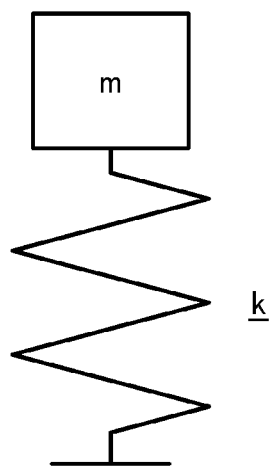
FIG. 6B is a diagram illustrating a spring performing simple harmonic oscillation.

FIGS. 6A and 6B are explanatory diagrams of a sound absorber 600 having a Helmholtz resonator structure. FIG. 6A is a schematic diagram of the sound absorber 600, and FIG. 6B is a schematic diagram of a spring system that performs simple harmonic oscillation.

As illustrated in FIG. 6A, the sound absorber 600 having a Helmholtz resonator structure has a shape like a container with a narrowed inlet, and is configured from a cavity 601 with a certain volume and a communication hole 602 smaller than the cavity 601. Then, the sound absorber 600 absorbs a sound having a specific frequency which enters the communication hole 602.

When a sound wave from an outside enters the communication hole 602 of a structure in which the cavity 601 with a volume "V" illustrated in FIG. 6A is provided with the communication hole 602 with a diameter "d" and a length "L", the air in the communication hole 602 portion is integrally pushed into the cavity 601 by the sound wave. At that time, the pressure inside the sealed cavity 601 is increased, and performs an action to push back the pushed-in air in the communication hole 602. The pushed back air in the communication hole 602 is pushed back to an outside of the hole, but the air tries to return by inertia. By repetition of this operation, the sound absorber 600 can be regarded as a spring system that performs simple harmonic oscillation with a mass "m" and a spring constant "k" illustrated in FIG. 6B. It is known that the resonant frequency of the Helmholtz resonator can be calculated by the following Equation (1).

$$f = \frac{C}{2\pi} \sqrt{\frac{S}{(L+\delta)V}}, \tag{1}$$

where "f" represents a resonant frequency [Hz], "C" represents a sound speed [m/s], "S" represents a cross-sectional area of the communication hole ($\pi/4 \cdot d^2$) [m²], "L" represents a length of the communication hole [m], "δ" represents a correction term by opening end [m], and "V" represents a volume of the cavity [m³]).

In a case in which a plurality of communication holes 602 are arranged in a single cavity 601, similar calculation can be made by considering a sum up of the cross-sectional areas of the communication holes 602 as the cross-sectional area "S" of the communication holes 602.

The air in the communication hole 602 intensely vibrates at a frequency near the resonant frequency. In a boundary layer near a wall surface of the communication hole 602, a fluid (the air) receives resistance by viscosity, energy of the vibration is converted into thermal energy due to viscous resistance. Energy of the sound by the entering sound wave is converted into the thermal energy by such a mechanism, so that the energy of the sound is decreased. Therefore, the sound absorber 600 having a Helmholtz resonator structure exhibits sound absorbing effects.

The ADF 5 of the present embodiment includes, as the sound absorber 600, a fixed sound absorber 300 in which the direction of the communication hole 602 is fixed, and a movable sound absorber 400 in which the direction of the communication hole 602 is configured to be movable. The fixed sound absorber 300 and the movable sound absorber 400 will be described below.

Figure 7:
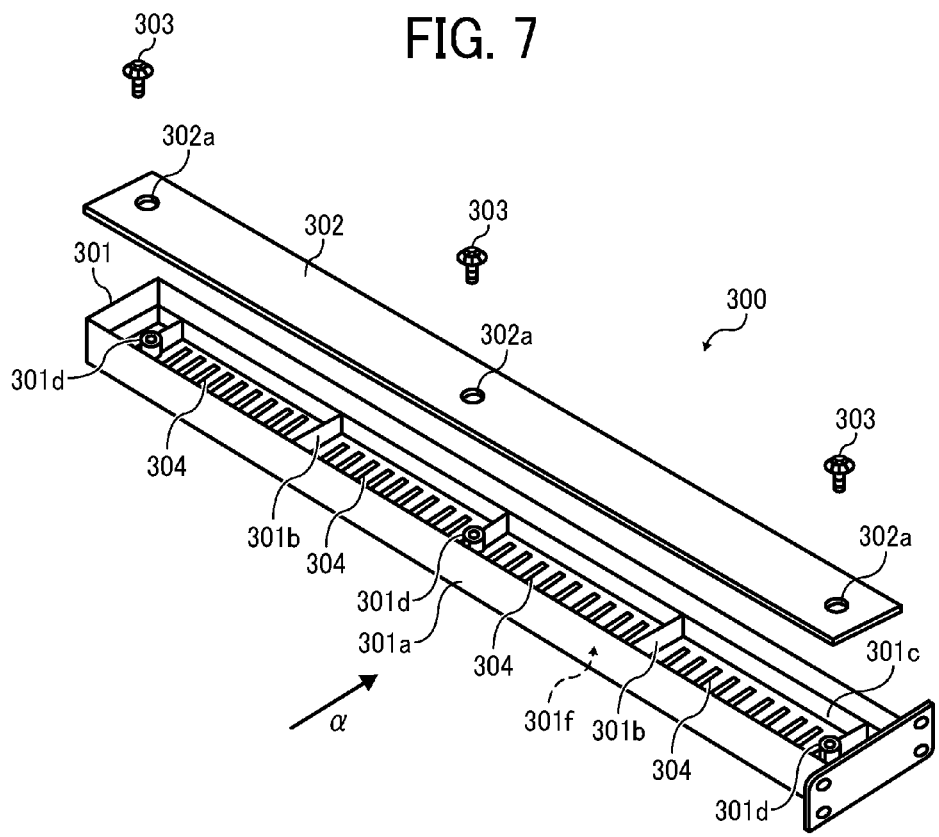
FIG. 7 is an exploded perspective view illustrating a sheet guide member and a sealing member of a fixed sound absorber.

FIG. 7 is an exploded perspective view of a sheet guide 301 and a sealing member 302 that configure the fixed sound absorber 300 formed in the sheet guide 301. Further, FIG. 8 is a perspective view of the fixed sound absorber 300 in a state in which the sheet guide 301 and the sealing member 302 are joined, and FIG. 9 is a cross sectional view of the fixed sound absorber 300 illustrated in FIG. 8.

Figure 8:
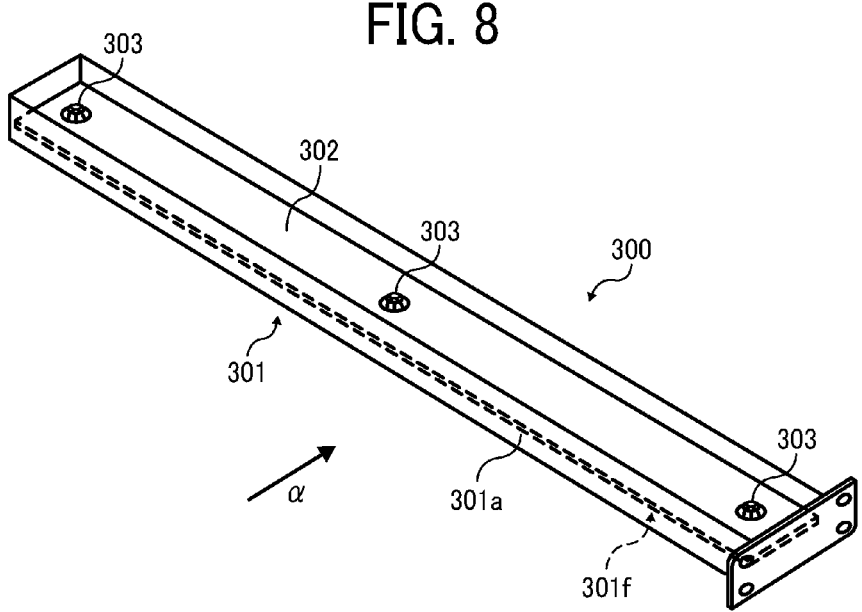
FIG. 8 is a perspective view illustrating the fixed sound absorber with the sheet guide member and the sealing member attached to the sheet guide member.
Figure 9:
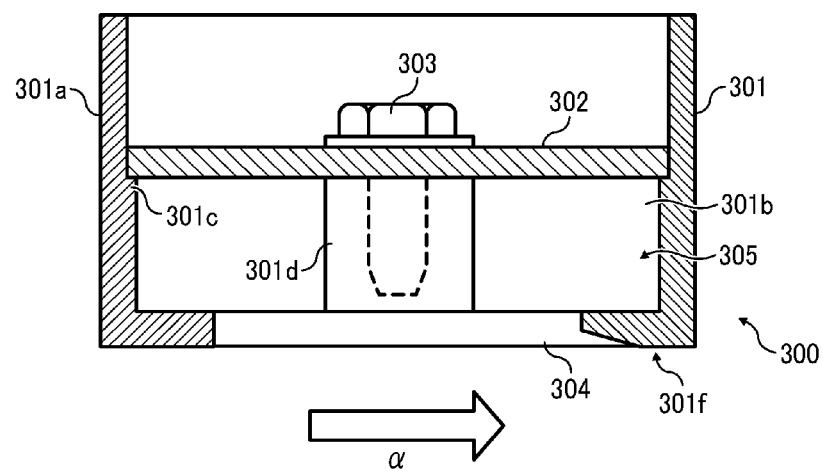
FIG. 9 is a cross sectional view illustrating the fixed sound absorber of FIG. 8.

Arrow "α" in FIGS. 7 through 9 represents the conveying direction of the document sheet $S_D$.

As illustrated in FIGS. 7 to 9, an opening 304 having a slit shape is provided in a guide face 301f in the sheet guide 301 for guiding the document sheet $S_D$ in a predetermined direction. The entire sheet guide 301 has a box shape with a peripheral wall portion 301a formed to surround a backside surface of the guide face 301f to prevent deformation due to contact of the document sheet $S_D$. Further, a reinforcing rib 301b is arranged an inside surrounded by the peripheral wall portion 301a.

In the present embodiment, the height of the reinforcing rib 301b is approximately half of the peripheral wall portion 301a of the sheet guide 301. However, the height of the reinforcing rib 301b is not limited thereto, and may be changed according to the volume of a guide cavity 305 and the like necessary for sound absorption. Further, in the present embodiment, five reinforcing ribs 301b are provided in the sheet guide 301. However, the number of the reinforcing ribs 301b is not limited thereto.

A stepped wall 301c stepped down to have the same height as the reinforcing rib 301b is formed inside the peripheral wall portion 301a of the sheet guide 301, and the sealing member 302 is installed on the stepped-down stepped wall 301c without a gap, as illustrated in FIG. 8.

The sheet guide 301 and the sealing member 302 are screwed to screw receiving parts 301d provided in three of the five reinforcing ribs 301b through a plurality of sealing member openings 302a provided in the sealing member 302 with threaded fasteners 303. Accordingly, as illustrated in FIG. 9, the guide cavity 305 is formed on a back surface of the sheet feeding passage, and the opening 304 allows the guide cavity 305 and the sheet feeding passage to communicate into each other. The fixed sound absorber 300 having a Helmholtz resonator structure is formed by the guide cavity 305 and the opening 304 formed as described above. The opening 304 configures the communication hole 602 and the guide cavity 305 configures the cavity 601 in the above-described sound absorber 600.

The hole shape of the opening 304 has a slit shape (rectangular shape) in the sheet guide 301 illustrated in FIG. 7. The shape of the opening 304 may be other shapes such as a circular shape.

Figure 10:
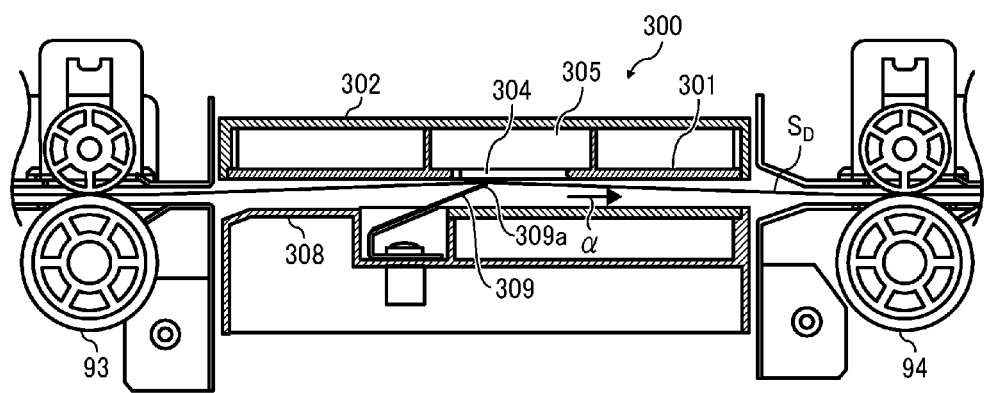
FIG. 10 is a diagram illustrating a configuration including the fixed sound absorber disposed in a sheet conveying passage of a sheet ejecting device.

FIG. 10 is an explanatory diagram of a configuration in which the fixed sound absorber 300 formed in the sheet guide 301 is arranged on the sheet feeding passage between the pair of second reading outlet rollers 93 and the pair of document sheet ejection rollers 94 in the sheet ejecting part G.

In the configuration illustrated in FIG. 10, a lower sheet guide 308 is arranged to face the sheet guide 301 across the sheet feeding passage, and a guide support 309 is further arranged in the lower sheet guide 308. The sheet guide 301 and the lower sheet guide 308 are made of resin material, and the guide support 309 is made of metal material.

The document sheet $S_D$ is conveyed on the sheet feeding passage between the sheet guide 301 and the lower sheet guide 308 by the pair of second reading outlet rollers 93 from an upstream side. The document sheet $S_D$ that passes through the sheet feeding passage is guided to the nip region of the pair of document sheet ejection rollers 94 by the sheet guide 301, the lower sheet guide 308, and the guide support 309.

The document sheet $S_D$ conveyed on the sheet feeding passage comes in contact and slides with the sheet guide 301 and the lower sheet guide 308 to generate the sliding sound. This sound is also referred to as a sheet sliding sound.

The sheet sliding sound is also generated in a case in which the surface of the document sheet $S_D$ or an end surface of the document sheet $S_D$ comes in contact and slides with the sheet guide 301 or the lower sheet guide 308. However, a particularly large sliding sound is generated when the document sheet $S_D$ comes in contact and slides with a portion where a curvature is sharply changed like an edge portion 309a of the guide support 309, which is harder than the sheet guide 301 and the lower sheet guide 308. This is because the surface of the document sheet $S_D$ performs a line contact with the edge portion 309a of the guide support 309 while the contact with the surface of the sheet guide 301 or the lower sheet guide 308 is a surface contact, and a contact pressure locally working on the surface of the document sheet $S_D$ becomes large. In such a case, as a sound source of the sliding sound that is more likely to result in a noise, a contact portion between the edge portion 309a of the guide support 309 and the document sheet $S_D$ becomes a linear sound source, and the sliding sound is propagated in all directions from the sound source.

Next, a layout of the sound absorber 600 having a Helmholtz resonator structure to a sound source will be described.

In a case in which the sound absorber 600 is arranged in a position separated from the sound source, a ratio of the sound propagated into the communication hole 602 of the sound absorber 600, of the sound generated from the sound source, becomes small, and only a part of the energy of the generated sound can be converted into the thermal energy. That is, the sound absorbing effects become very small. Therefore, it is desirable to arrange the communication hole 602 of the sound absorber 600 to cover the sound source as much as possible.

To be more specific, like the configuration illustrated in FIG. 10, it is favorable to arrange the opening 304 as the communication hole 602 in the fixed sound absorber 300 to overlap with the edge portion 309a as the sound source, in the conveying direction (the direction illustrated by arrow "a" in FIG. 10) of the document sheet $S_D$.

Further, when the distance between the sound source and the communication hole 602 of the sound absorber 600 is separated in a direction perpendicular to the conveying direction of the document sheet $S_D$, the ratio of the sound propagated into the communication hole 602, of the generated sound, becomes small. Therefore, in the configuration illustrated in FIG. 10, it is desirable that the edge portion 309a as the sound source and the opening 304 as the communication hole 602 are as close as possible.

The sound absorber 600 absorbs the sound propagated into the communication hole 602. Therefore, it is favorable that the opening area of the communication hole 602 is large. However, when the opening area "S" of the communication hole 602 is made large, the resonant frequency becomes high as is clear from Equation (1) above. Therefore, in order to maintain the resonant frequency while making the opening area "S" of the communication hole 602 large in order to enhance sound absorption efficiency to the sound absorber 600, the length "L" of the communication hole 602 and the volume "V" of the cavity 601 are increased.

Further, as described using FIG. 6, to generate a resonance phenomenon in the Helmholtz resonator, the air in the communication hole 602 is integrally moved, and the cross-sectional area of the communication hole 602 is small to an extent with respect to the cross-sectional area of the cavity 601. Typically, a ratio of the cross sectional area of the communication hole 602 and the cross-sectional area of the cavity 601 is called aperture ratio, and it is known that the resonance phenomenon occurs if the aperture ratio is up to about 25 [%]. Therefore, a compact sound absorber with high sound absorbing effects can be obtained by making the cross-sectional area of the communication hole 602 as large as possible, and setting the cross-sectional area of the cavity 601 to have the aperture ratio of about 25 [%].

Next, a description is given of a relationship between the sliding sound of the document sheet $S_D$ and the resonant frequency of the sound absorber 600.

Figure 11:
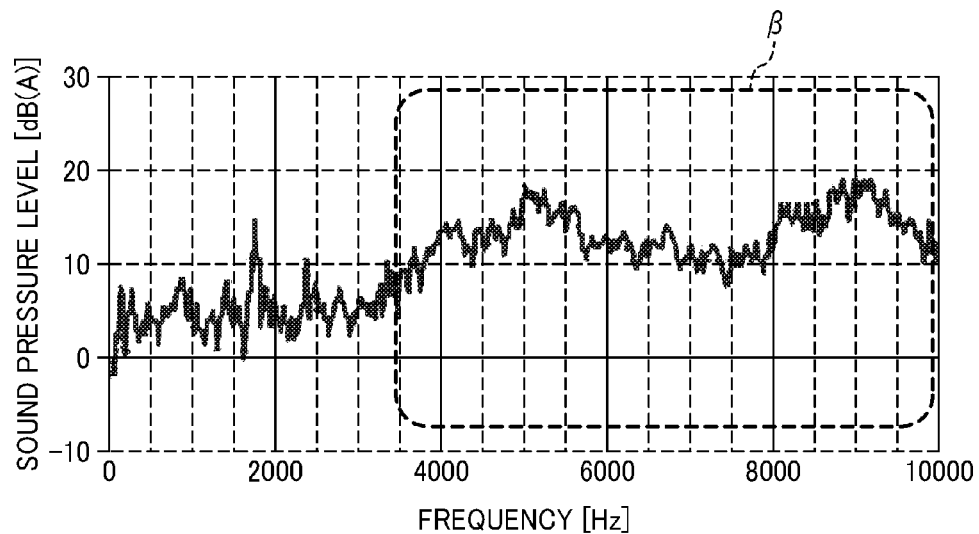
FIG. 11 is a graph illustrating an example of frequency characteristic of sliding sound that occurs when conveying an original document.

FIG. 11 is a graph illustrating an example of frequency characteristics of the sliding sound generated at the time of conveying the document sheet $S_D$.

In the sliding sound illustrated in FIG. 11, a sound in a sound pressure level of a specific frequency is not large, and the sound pressure level is large in a broad frequency band of 3.5 [kHz] or more, as illustrated in the area "β" surrounded by the broken line in FIG. 11.

Further, a sound near 4 [kHz] is known as a sound having a frequency to which the auditory sense of human is most sensitive. When the sound having the frequency around 4 [kHz] is decreased, a sound having a frequency in which an A-weighted sound pressure level can be easily made large, the A-weighted sound pressure level being obtained by applying A-weighted correction in consideration of aural characteristics of human to the sound pressure level, can be absorbed, and substantial effects can be expected in a reduction of noises. Therefore, it is desirable to configure the shapes of the cavity 601 and the communication hole 602 of the sound absorber 600 arranged to restrain noises of the sliding sound of the document sheet $S_D$ such that the resonant frequency becomes 4 [kHz] on the basis of the Equation (1) above.

Next, a description is given of a configuration to enhance the sound absorbing effects of the fixed sound absorber 300.

Figure 12:
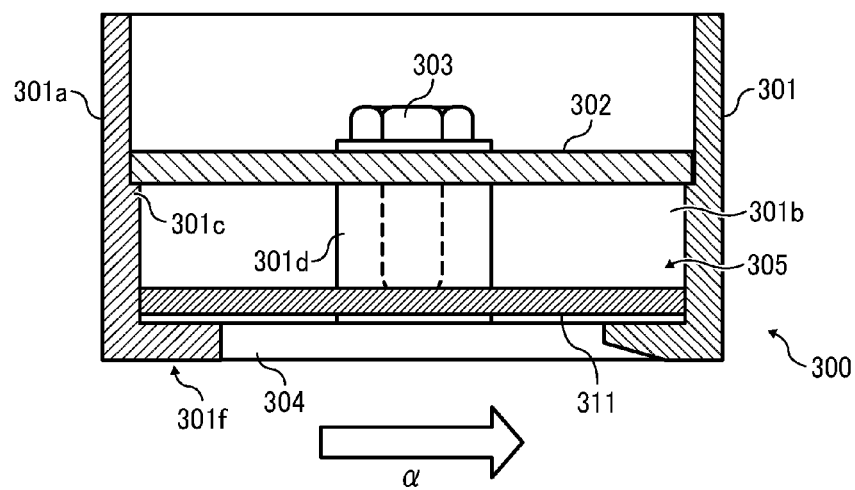
FIG. 12 is a cross sectional view illustrating a configuration including the fixed sound absorber having an opening including a porous material member.

FIG. 12 is a cross-sectional view of a configuration in which a porous component 311 is arranged on the opening 304 of the fixed sound absorber 300 illustrated in FIG. 9 and the like.

As the porous component 311 arranged in the fixed sound absorber 300 illustrated in FIG. 12, foamed polyurethane having an open-cell structure in which small holes used as sound absorption material communicate can be used, for example.

As described using FIG. 6, the sound absorbing effects of the sound absorber 600 having a Helmholtz resonator structure are exhibited when the vibration energy of the sound is converted into the thermal energy due to viscous resistance of the vibration of the air against the wall surface of the communication hole 602.

However, in the configuration illustrated in FIG. 9, the viscous resistance acts on an area near the wall surface of the opening 304, and thus the sound absorbing effects are small. As a method to enhance the sound absorbing effects, making the area ratio of the wall surface of the opening 304 to the cross-sectional area of the opening 304 large by making the opening 304 very small can be considered. However, machining of fine hole is difficult and component cost becomes high.

By contrast, similar to the configuration as illustrated in FIG. 12, the viscous resistance can be provided to the entire air displaced in the opening 304 by arranging the porous component 311 on the rear side (back side) of the guide face 301f across the opening 304, inside the sheet guide 301.

Figure 13:
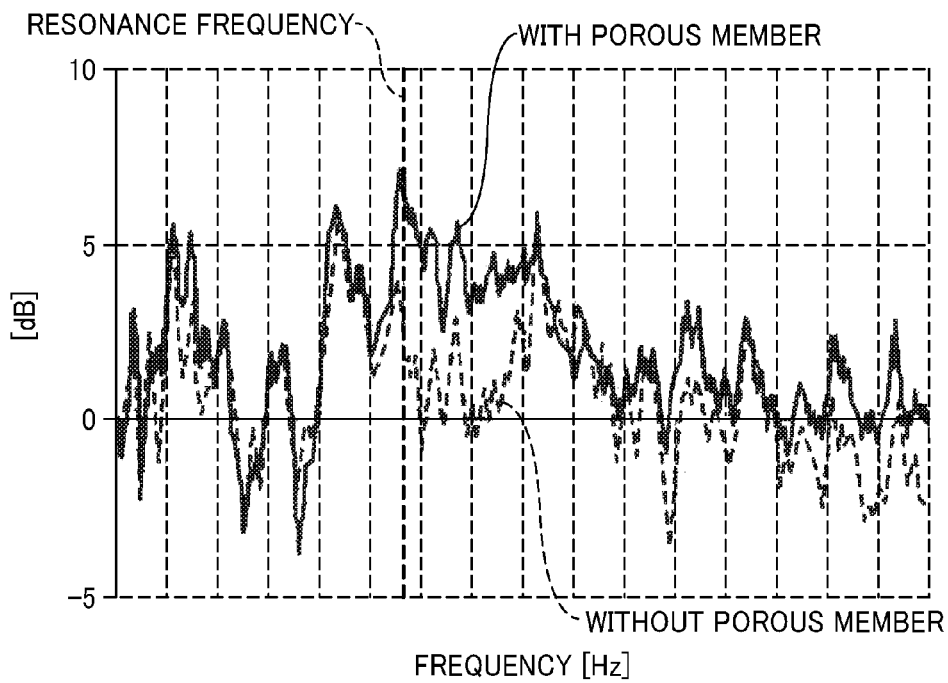
FIG. 13 is a graph illustrating comparison of sound absorbing effects between a fixed sound absorber employing a porous material member and a fixed sound absorber not employing a porous material member.

FIG. 13 is a graph comparing the sound absorbing effects between the fixed sound absorber 300 including the porous component 311 as illustrated in FIG. 12, and the fixed sound absorber 300 without including the porous component 311 as illustrated in FIG. 9.

As illustrated in FIG. 13, by including the porous component 311, the sound absorbing effects of the fixed sound absorber 300 can be enhanced.

The configuration to arrange the porous component 311 to enhance the sound absorption efficiency is applicable to the movable sound absorber 400 described below.

In the configuration illustrated in FIG. 12, the porous component 311 is provided separately from the sheet guide 301 that forms the fixed sound absorber 300. However, the sheet guide 301 itself may be molded with porous plastic having an open-cell structure. Accordingly, similar to the configuration as illustrated in FIG. 12, the vicious resistance near the wall surface of the opening 304 is increased, and the sound absorbing effects can be enhanced.

Next, a description is given of the movable sound absorber 400.

Figure 1B:
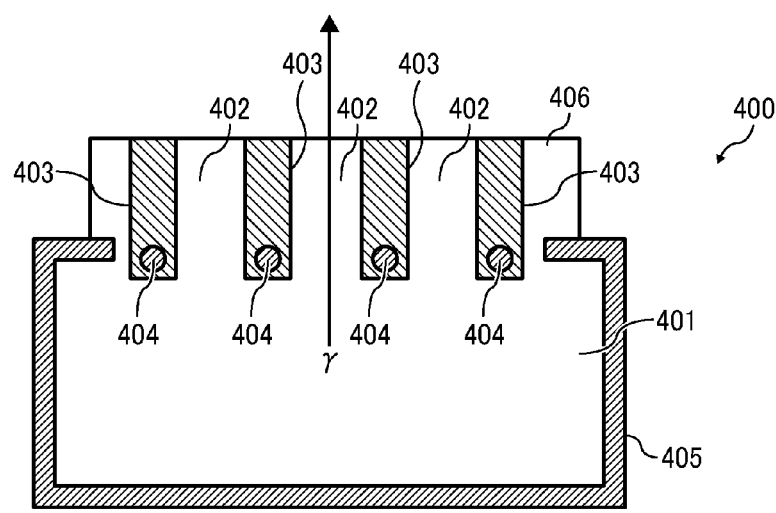
FIG. 1B is a side view illustrating the movable sound absorber of FIG. 1A.
Figure 1C:
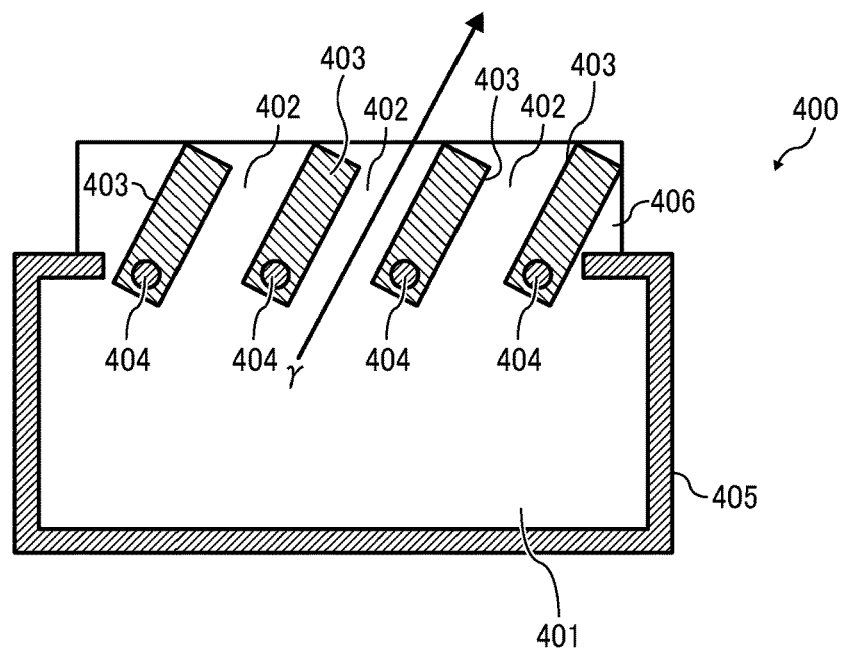
FIG. 1C is a cross sectional view illustrating the movable sound absorber of FIG. 1A.
Figure 1D:
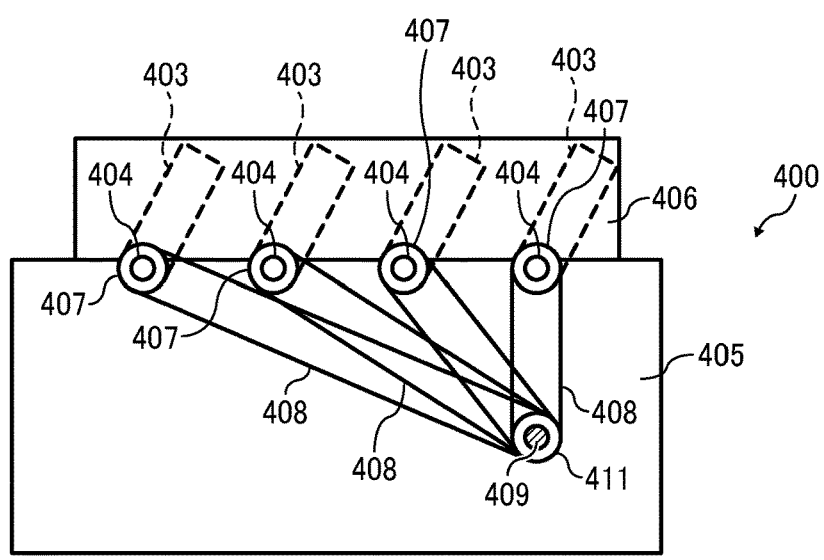
FIG. 1D is a front view illustrating the movable sound absorber of FIG. 1A.

FIGS. 1A to 1D are explanatory diagrams of the movable sound absorber 400. FIG. 1A is a side view of the movable sound absorber 400, and FIG. 1B is a cross-sectional view of the movable sound absorber 400 as viewed from the I-I cross section in FIG. 1A. FIG. 1C is a cross-sectional view of the movable sound absorber 400 in a state in which a communication direction of the communication hole is changed from the state illustrated in FIG. 1B, and FIG. 1D is a front view of the movable sound absorber 400 when the state illustrated in FIG. 1C is viewed from the J-J cross section in FIG. 1A.

The movable sound absorber 400 illustrated in FIGS. 1A to 1D has a configuration in which a plurality of movable plates 403 are arranged in the movable sound absorber housing 405 in a swingable manner around respective plate rotation shafts 404. Fixing plates 406 in contact with both end portions of the movable plates 403 in a width direction are provided on both ends of the movable sound absorber 400 in a width direction (a right and left direction in FIG. 1A).

In the movable sound absorber 400 as illustrated in FIGS. 1A to 1D, a movable sound absorption cavity 401 that functions as the cavity 601 is formed inside the movable sound absorber housing 405. Further, a space surrounded by two adjacent movable plates 403 and two fixing plates 406 on both end portions in the width direction communicates the movable sound absorption cavity 401 and the sheet feeding passage being an outside and forms a movable sound absorption communication opening 402 that functions as the communication hole 602.

As illustrated in FIGS. 1B and 1C, the movable sound absorber 400 has a configuration in which the communication direction (the direction illustrated by arrow "y" in FIGS. 1B and 1C) of the movable sound absorption communication opening 402 is changed by allowing the movable plate 403 to swing around the plate rotation shaft 404.

Here, the communication direction of the movable sound absorption communication opening 402 is a direction parallel to a virtual straight line connecting a center of gravity of an opening cross section shape of an end portion on the movable sound absorption cavity 401 side, in the movable sound absorption communication opening 402, and a center of gravity of an opening cross section shape of an end portion on an outside, in the movable sound absorption communication opening 402.

The movable sound absorber 400 illustrated in FIGS. 1A to 1D has a configuration to cause the movable plate 403 to swing when a movable plate drive motor 410 is driven.

To be more specific, when the movable plate drive motor 410 is driven, a driving force output shaft 411 is rotated, and a drive force output pulley 409 secured to the driving force output shaft 411 is rotated. The rotation of the drive force output pulley 409 is transmitted to four drive force input pulleys 407 through four driving transmission belts 408, and the plate rotation shafts 404 to which the drive force input pulleys 407 are secured are rotated, and the movable plates 403 secured to the plate rotation shafts 404 respectively swing. Accordingly, inclinations of the movable plates 403 with respect to the movable sound absorber housing 405 are changed, and the communication directions of the movable sound absorption communication openings 402 are changed.

The movable sound absorption communication opening 402 of the movable sound absorber 400 has a slit shape extending in the width direction (the right and left direction in FIG. 1A and a direction perpendicular to the sheet surface in FIGS. 1B to 1D). Then, by changing respective angles of the plurality of movable plates 403 that forms the movable sound absorption communication openings 402 such as a louver of a window shade, the communication directions of the movable sound absorption communication openings 402 are changed. The communication direction can be changed in this way, and thus when an installation location is shifted from the sound source, the movable sound absorption communication opening 402 can be directed to the sound source. Therefore, more effective sound absorbing effects can be obtained.

As described above, in the movable sound absorber 400 illustrated in FIGS. 1A to 1D, adjustment of the communication direction is performed by driving the movable plate drive motor 410. Further, the movable sound absorber 400 illustrated in FIGS. 1A to 1D has a configuration in which a directional microphone 421 is included, a movable plate angle controller 420 controls driving of the movable plate drive motor 410 on the basis of a detection result of the directional microphone 421, and the angles of the movable plates 403 are automatically set.

Figure 14:
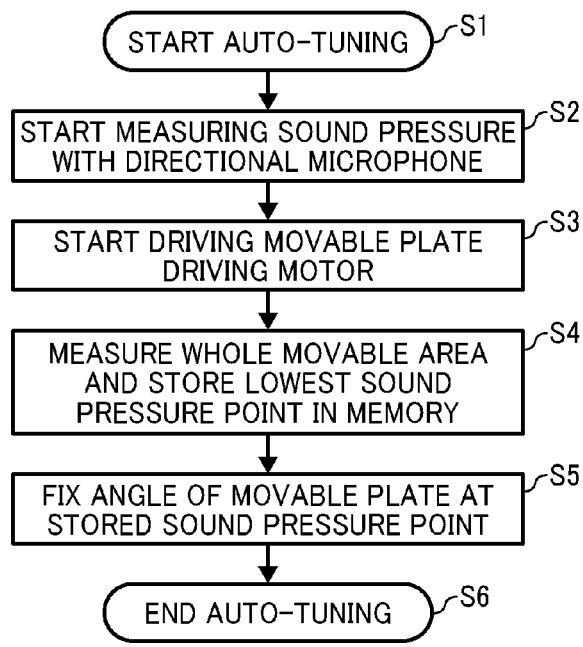
FIG. 14 is a flowchart of automatic tuning control performing an automatic setting of an angle of a movable plate.

FIG. 14 is a flowchart of automatic tuning in which the movable plate angle controller 420 automatically performs the setting of angles of the movable plates 403.

When the automatic tuning is started, in step S1, an ambient sound pressure is measured by the directional microphone 421 arranged near an outside end portion of the movable sound absorption communication opening 402, in step S2. The movable plate driving motor 410 is driven while the sound pressure is measured by the directional microphone 421, in step S3, and the sound pressure is measured for all of angles by changing angles in stages within an angle changeable range of the movable plate 403. At this time, a point (the angle of the movable plate 403) at which the sound pressure measured by the directional microphone 421 becomes lowest is constantly stored, and the point at which the sound pressure becomes lowest is stored, in step S4. When the measurement is completed and the point where the sound pressure is most decreased is determined, the movable plate driving motor 410 is driven to change the angle of the movable plate 403 up to the point where the sound pressure is most decreased.

There is a possibility that an occurrence state of the sound including the frequency to be absorbed may be changed over time after the sound absorber 600 is installed in the ADF 5. When the occurrence state of the sound is changed, the optimum communication direction of the communication hole 602 of the sound absorber 600 having a Helmholtz resonator structure may be changed.

By contrast, the movable sound absorber 400 illustrated in FIGS. 1A to 1D can change the communication direction of the movable sound absorption communication opening 402. Therefore, even when the occurrence state of the sound including the frequency to be absorbed is changed over time after the movable sound absorber 400 is installed in the ADF 5, and the optimum communication direction is changed, the communication direction of the movable sound absorption communication opening 402 can be directed to an optimum direction.

Setting the angle of the movable plate 403 is not limited to the automatic setting, but the angle may be manually set. In a case of manually setting the angle, an angle is directly inputted on an operation panel of the instruction input unit 108 and the angle of the movable plate 403 is changed. Further, the angle of the movable plate 403 may be adjusted according to the number of times of pressing an adjustment button that can change the angle by several degrees.

Then, the movable plate angle controller 420 controls driving of the movable plate drive motor 410 such that the angle of the movable plate 403 becomes the angle set on the operation panel, and the communication direction of the movable sound absorption communication opening 402 is changed.

Variation.

Figure 15:
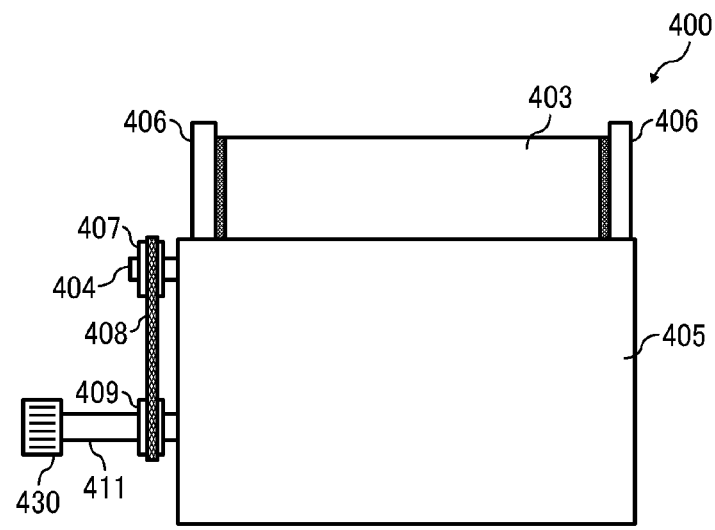
FIG. 15 is a side view illustrating a movable sound absorber according to a variation of an embodiment of this disclosure.

FIG. 15 is a side view of a movable sound absorber 400 of a variation. A cross-sectional view and a front view of the movable sound absorber 400 are similar to those in FIGS. 1B to 1D.

The movable sound absorber 400 of the variation illustrated in FIG. 15 has a configuration in which a handle 430 is fixed to a driving force output shaft 411, in place of the movable plate drive motor 410 of the movable sound absorber 400 illustrated in FIGS. 1A to 1D. When a user or a person in charge of maintenance pinches the handle 430 with fingers and rotates the handle 430, the driving force output shaft 411 is rotated, and a movable plate 403 swings, similarly to the movable sound absorber 400 of FIG. 1. Therefore, a communication direction of a movable sound absorption communication opening 402 can be changed with a simple structure without including a drive source like the movable plate drive motor 410.

Next, a description is given of an installation example of the movable sound absorber 400 in the ADF 5.

Figure 16:
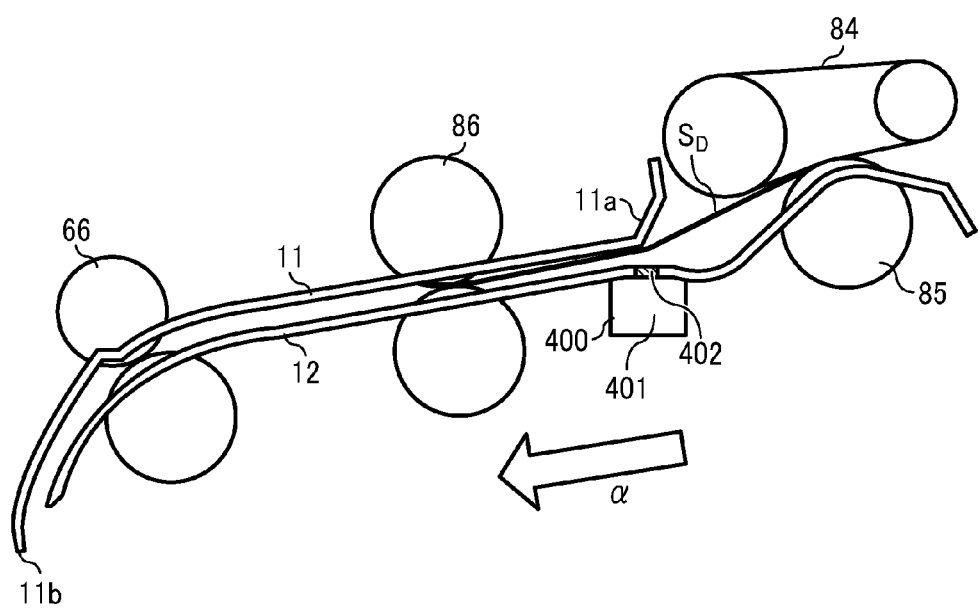
FIG. 16 is a diagram illustrating a movable sound absorber provided to a registration part.

FIG. 16 is an explanatory diagram of an example in which the movable sound absorber 400 is installed in the registration part C. As illustrated in FIG. 16, in the registration part C, the sheet feeding passage on which the document sheet $S_D$ passes through is formed between a registration outer guide 11 and a registration inner guide 12. Arrow "α" in FIG. 16 is the conveying direction of the document sheet $S_D$ in the registration part C.

In the ADF 5 illustrated in FIG. 3, the separation belt 84 is stopped when the pair of pullout rollers 86 conveys the document sheet DS. Therefore, the document sheet DS is conveyed in a state of being strained between the separation nip region and the nip of the pair of pullout rollers 86. At this time, as illustrated in FIG. 16, if there is a portion protruding toward the sheet feeding passage, such as a corner 11a in the registration outer guide 11 between the separation nip and the nip of the pair of pullout rollers 86, the strained document sheet DS comes in linear contact with the corner 11*a*. A large sliding sound is generated at the corner 11*a* due to the linear contact.

Therefore, in the installation example illustrated in FIG. 16, the movable sound absorber 400 is provided in a position of the registration inner guide 12 that faces the registration outer guide 11, the position facing the corner 11*a* across the sheet feeding passage.

By providing the movable sound absorber 400 in the position facing the corner 11*a*, the sliding sound generated at the corner 11*a* can be efficiently absorbed. Further, in a case in which the movable sound absorber 400 can be installed in a position shifted from the position facing the corner 11*a* due to limitations of layout, the angle of the movable plate 403 is adjusted such that the movable sound absorption communication opening 402 of the movable sound absorber 400 is directed to the corner 11*a*. Accordingly, the sliding sound at the time of a pull-out operation can be efficiently decreased.

Figure 17:
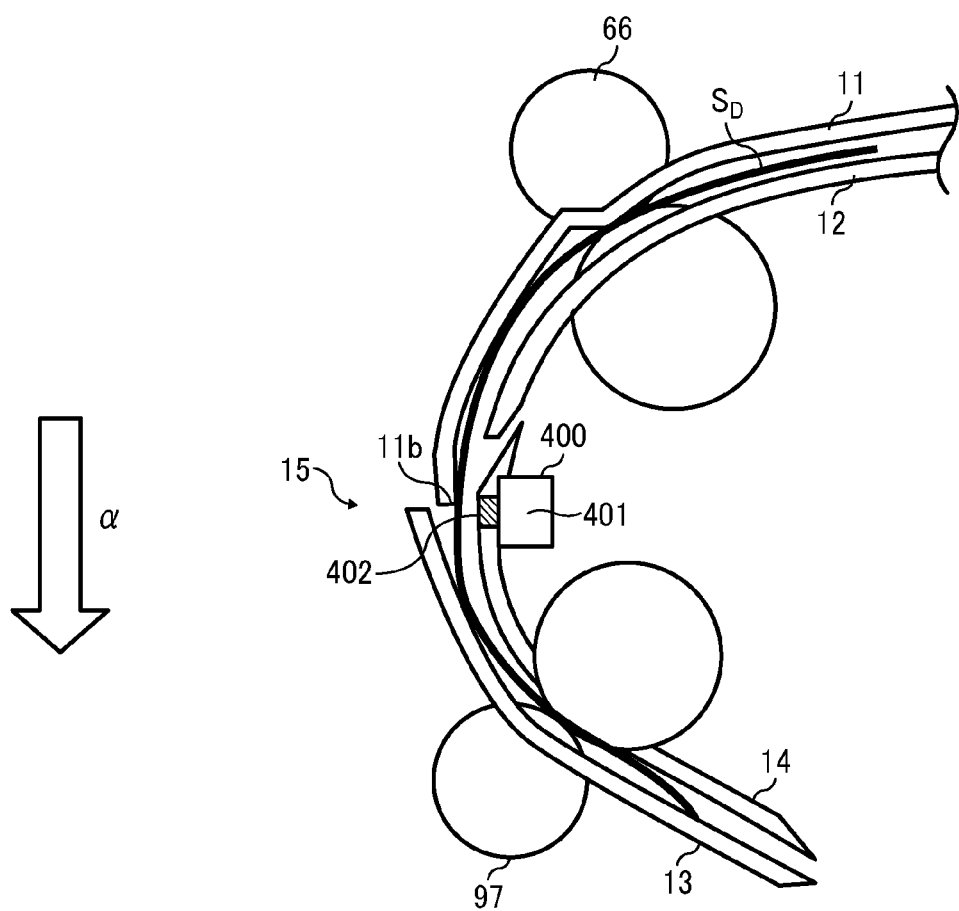
FIG. 17 is a diagram illustrating a movable sound absorber provided to a turning part.

FIG. 17 is an explanatory diagram of an example in which the movable sound absorber 400 is installed in the turning part D. As illustrated in FIG. 17, in the turning part D, the sheet feeding passage on which the document sheet DS passes through is formed between the registration outer guide 11 and a turning portion outward member 13, and the registration inner guide 12 and a turning portion inward member 14. Arrow "α" in FIG. 17 is the conveying direction of the document sheet DS in the turning part D.

In the turning part D, the document sheet DS is turned by about an angle of 180 degrees and is conveyed. In such a case, it is difficult to form a guide member that forms an outer side wall surface of the sheet feeding passage in the turning part D with one member by bending the member in a large manner. Therefore, the ADF 5 of the present embodiment has a configuration in which two guide members including the registration outer guide 11 and the turning portion outward member 13 are arranged, and delivery of the document sheet DS in the turning part D is performed. Then, a downstream end 11*b* of the upstream registration outer guide 11 is positioned inside the turning portion outward member 13 so that the leading end of the conveyed document sheet S$_D$ is not caught by a joint 15 between the registration outer guide 11 and the turning portion outward member 13. The downstream end 11*b* is positioned inside the turning portion outward member 13, and thus the conveyed document sheet DS and the downstream end 11*b* of the registration outer guide 11 are strongly in contact, and a large sliding sound is generated.

Therefore, in the installation example illustrated in FIG. 17, the movable sound absorber 400 is provided in a position of the turning portion inward member 14 that forms an inner side wall surface in the sheet feeding passage of the turning part D, the position facing the downstream end 11*b* across the sheet feeding passage.

By providing the movable sound absorber 400 in the position facing the downstream end 11*b*, the sliding sound generated at the downstream end 11*b* can be efficiently absorbed. Further, even when the movable sound absorber 400 can be installed in a position shifted from the position facing the downstream end 11*b* due to limitations of layout, the angle of the movable plate 403 is adjusted such that the movable sound absorption communication opening 402 of the movable sound absorber 400 is directed to the downstream end 11*b*. Accordingly, the sliding sound at the time of a turn operation can be decreased.

A configuration to turn the sheet by an angle of 90 degrees to 180 degrees and convey the sheet like the turning part D is not limited to the ADF 5. A configuration to convey the sheet by an angle of 90 degrees to 180 degrees within an apparatus to make an installation area small, even in a sheet feeder provided in an image forming apparatus like a printer is known.

In such a configuration, by providing the movable sound absorber 400 in a position facing a portion where the sheet strongly slides with a guide member across the sheet feeding passage, similar to the installation example illustrated in FIG. 17, the sliding sound at the time of a turn operation can be efficiently decreased.

A case in which the optimum communication direction of the communication hole 602 is different depending on a place where the sound absorber 600 is installed, in installing the sound absorber 600 in the ADF 5, can be considered. In such a case, if a special sound absorber 600 corresponding to installation positions is manufactured, the cost may be increased. The configuration using the movable sound absorber 400 of the present embodiment adjusts the angle of the movable plate 403 such that the movable sound absorption communication opening 402 is directed to the sound source, in manufacturing and installing a common movable sound absorber 400 in the ADF 5 regardless of the installation positions. Accordingly, the sound absorber installed in the ADF 5 can be shared, and the cost can be reduced.

Further, even if the installation position of the sound absorber 600 is the same, the communication direction of the communication hole 602, in which the sound can be most efficiently absorbed, may be different in each ADF 5 due to tolerance at the time of manufacturing. The configuration using the movable sound absorber 400 of the present embodiment can adjust the angle of the movable plate 403 after installation, and can set the communication direction of the movable sound absorption communication opening 402 to the direction in which the sound can be most efficiently absorbed.

The ADF 5 of the present embodiment includes the movable sound absorber 400, thereby to enhance sound absorption efficiency of the sliding sound caused at the time of conveying the document sheet DS, and to reduce occurrence of noises caused by the sliding sound of the document sheet DS.

Further, the document conveying and reading unit 6 as an image reading device of the present embodiment includes the ADF 5, thereby to reduce occurrence of noises at the time of reading an image.

In the present embodiment, the configuration in which the movable sound absorber 400 is arranged in the ADF 5 as a sheet feeder has been described. However, the position where the movable sound absorber 400 is arranged is not limited to the inside of the sheet feeder, and can be installed in any place in the image forming apparatus.

Further, the electronic device including the movable sound absorber 400 is not limited to the image forming apparatus. The movable sound absorber 400 can be applied to an electronic device other than the image forming apparatus as long as the electronic device has a configuration including a sound source unit that generates a sound at the time of an operation, and a sound absorber that absorbs the sound generated from the sound source unit.

This configurations according to the above-descried embodiments are not limited thereto. This disclosure can achieve the following aspects effectively.

Aspect A.

A sound absorber such as the movable sound absorber 400 including a cavity such as the movable sound absorption cavity 401, a communicating portion such as the movable sound absorption communication opening 402 that allows the cavity and an outside such as the sheet feeding passage to communicate into each other, wherein a communication direction changing device including the plate rotation shaft 404, the movable plate 403, and the like that make a communication direction of the communicating portion variable is included.

According to this configuration, as described in the above-embodiment, the communication direction of the communicating portion can be changed in a direction in which the sound absorption efficiency becomes high by the communication direction changing device. Accordingly, the sound absorption efficiency of the sound absorber can be enhanced, and the occurrence of noise can be reduced.

Aspect B.

In the aspect A, plate members such as the plurality of movable plates 403 arranged in a louver manner in a cavity forming body such as the movable sound absorber housing 405 that forms the cavity such as the movable sound absorption cavity 401 are included, the communicating portion such as the movable sound absorption communication opening 402 is formed in a gap between the plurality of plate members, and the communication direction changing device including the plate rotation shaft 404, the movable plate 403, and the like can change attaching angles of the plurality of plate members with respect to the cavity forming body.

According to this configuration, as described in the above-embodiment, the configuration to make the communication direction of the communicating portion formed in the gap between the plate members variable can be achieved.

Aspect C.

In the aspect A or B, the communication direction changing device including the plate rotation shaft 404, the movable plate 403, and the like includes a handle such as the handle 430, and manually changes the communication direction of the communicating portion such as the movable sound absorption communication opening 402.

According to this configuration, as described in the above variation, the communication direction of the communicating portion can be changed with a simple configuration without including a drive source.

Aspect D.

In Aspect A or Aspect B, the communication direction changing device including the plate rotation shaft 404, the movable plate 403, and the like includes a drive device such as the movable plate drive motor 410, and changes the communication direction of the communicating portion such as the movable sound absorption communication opening 402 by driving the drive device.

According to this configuration, as described in the above-embodiment, the communication direction of the communicating portion (for example, the movable sound absorption communication opening 402) can be automatically adjusted by control of driving of the drive source.

Aspect E.

In the aspect D, the communication direction changing device including the plate rotation shaft 404, the movable plate 403, the movable plate drive motor 410, and the like includes an input device such as the instruction input unit 108 that inputs the communication direction of the communicating portion such as the movable sound absorption communication opening 402, and a drive controller such as the movable plate angle controller 420 that controls driving of the drive device such as the movable plate drive motor 410 on the basis of an input value in the input device to adjust the communication direction of the communicating portion.

According to this configuration, as described in the above-embodiment, the communication direction of the communicating portion can be manually set.

Aspect F.

In the aspect D or E, the communication direction changing device including the movable plate 403, the movable plate drive motor 410, and the like includes a sound level measuring device such as the directional microphone 421 that measures a sound pressure, and a drive controller such as the movable plate angle controller 420 that controls driving of the drive device such as the movable plate drive motor 410 on the basis of a measurement result of the sound level measuring device to adjust the communication direction of the communicating portion such as the movable sound absorption communication opening 402.

According to this configuration, as described in the above-embodiment, the communication direction of the communicating portion can be automatically set.

Aspect G.

A sheet feeder such as the ADF 5 including a passage defining device such as the registration outer guide 11 and the registration inner guide 12 that form a sheet feeding passage on which a sheet such as the conveyed document sheet DS passes through, and a sound absorber that absorbs a sound, wherein the sound absorber such as the movable sound absorber 400 according to any one of the aspects A to F is included as the sound absorber.

According to this configuration, as described in the above-embodiment, the sound absorption efficiency of the sliding sound caused when the sheet is conveyed can be enhanced, and the occurrence of noise caused by the sliding sound of the sheet can be reduced.

Aspect H.

An image reading device such as the document conveying and reading unit 6 including a document feeder that conveys a document sheet such as the document sheet $S_D$ having a document image on a surface, and a document reading device such as the scanner 4 that reads the document image on the document sheet conveyed by the document feeder, wherein the sheet feeder such as the ADF 5 according to the aspect G is used as the document feeder.

According to this configuration, as described in the above-embodiment, occurrence of noise at the time of reading an image can be reduced.

Aspect I.

An image forming apparatus such as the image forming apparatus 1 including a sound absorber that absorbs a sound such as a sliding sound of the document sheet $S_D$ at the time of an operation, wherein the sound absorber such as the movable sound absorber 400 according to any one of the aspects A to F is used as the sound absorber.

According to this configuration, as described in the above-embodiment, the sound absorption efficiency of an operation sound at the time of forming an image can be enhanced, and the occurrence of noise can be reduced.

Aspect J.

An electronic device such as the image forming apparatus 1 including a sound absorber that absorbs a sound such as a sliding sound of the document sheet $S_D$ at the time of an operation, wherein the sound absorber such as the movable sound absorber 400 according to any one of the aspects A to F is used as the sound absorber.

According to this configuration, as described in the above-embodiment, the sound absorption efficiency of the operation sound can be enhanced, and the occurrence of noise can be reduced.

The above-described embodiments are illustrative and do not limit this disclosure. Thus, numerous additional modifications and variations are possible in light of the above teachings. For example, elements at least one of features of different illustrative and exemplary embodiments herein may be combined with each other at least one of substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of this disclosure may be practiced otherwise than as specifically described herein.

What is claimed is:

1. A sound absorber comprising:
    a cavity;
    a communicating portion through which the cavity communicates with an outside of the sound absorber; and
    a communication direction changing device configured to change a communication direction of the communicating portion while maintaining an orientation of the sound absorber as a whole, wherein the communication direction changing device includes a drive device configured to drive such that the communication direction of the communicating portion changes.

2. The sound absorber according to claim 1, further comprising:
    a cavity forming body configured to form the cavity; and
    multiple plates that are arranged on the cavity forming body to form a louver,
    wherein the communicating portion is defined as a gap formed between adjacent plates of the multiple plates, and
    wherein the communication direction changing device changes an angle of attachment of the multiple plates relative to the cavity forming body.

3. The sound absorber according to claim 1,
    wherein the communication direction changing device varying includes a handle configured to change the communication direction of the communicating portion.

4. The sound absorber according to claim 1,
    wherein the communication direction changing device includes:
        an input device configured to input the communication direction of the communicating portion; and
        a drive controller configured to control driving of the drive device based on an input value obtained via the input device and adjust the communication direction of the communicating portion.

5. The sound absorber according to claim 1,
    wherein the communication direction changing device includes:
        a sound level measuring device configured to measure a sound pressure; and
        a drive controller configured to control driving of the drive device based on a measurement result obtained by the sound level measuring device and adjust the communication direction of the communicating portion.

6. The sound absorber according to claim 1, further comprising:
    a sheet feeder comprising:
    a passage defining device configured to form a document feeding passage through which a document sheet passes.

7. The sound absorber according to claim 1, further comprising:
    an image forming apparatus, wherein the sound absorber is configured to absorb a sound at a time of an operation.

8. The sound absorber according to claim 1, further comprising:
    an electronic device comprising the sound absorber, wherein the sound absorber is configured to absorb a sound at a time of an operation.

9. An image reading device comprising:
    a document feeder configured to feed a document sheet having an image on a surface, the document feeder including a sheet feeder comprising:
        a passage defining device configured to form a document feeding passage through which the document sheet passes; and
        a sound absorber comprising a cavity, a communicating portion through which the cavity communicates with an outside of the sound absorber, and a communication direction changing device configured to change a communication direction of the communicating portion while maintaining an orientation of the sound absorber as a whole, wherein the communication direction changing device includes a drive device configured to drive such that the communication direction of the communicating portion changes; and
    a document reading device configured to read the image on the document sheet conveyed by the document feeder.

* * * * *